US008967487B2

(12) United States Patent
Saitoh et al.

(10) Patent No.: US 8,967,487 B2
(45) Date of Patent: Mar. 3, 2015

(54) NON-CONTACT COMMUNICATION DEVICE

(75) Inventors: Sachio Saitoh, Miyagi (JP); Osamu Ishii, Kanagawa (JP)

(73) Assignee: Sony Corporation

( * ) Notice: Subject to any disclaimer, the term of this patent is extended or adjusted under 35 U.S.C. 154(b) by 218 days.

(21) Appl. No.: 13/565,980

(22) Filed: Aug. 3, 2012

(65) Prior Publication Data

US 2013/0038503 A1 Feb. 14, 2013

(30) Foreign Application Priority Data

Aug. 10, 2011 (JP) ................................ 2011-174983

(51) Int. Cl.

*G06K 19/06* (2006.01)
*H01Q 21/28* (2006.01)
*H01Q 1/22* (2006.01)
*H01Q 7/00* (2006.01)

(52) U.S. Cl.

CPC ............. *H01Q 21/28* (2013.01); *H01Q 1/2216* (2013.01); *H01Q 1/2225* (2013.01); *H01Q 7/00* (2013.01)
USPC .......................................... 235/492; 343/867

(58) Field of Classification Search

CPC .......... G06K 19/07749; G06K 7/0008; G06K 19/07779; G06K 7/10316; G06K 19/07747; G06K 7/10366; G06K 17/0022; G06K 2017/0051; G06K 19/00786; G06K 7/10079; G01R 33/34076; G01R 33/34084; G01R 33/3415; G01R 33/3628; G01R 33/3657; G01R 33/3678; G01R 33/481; G01R 33/56; G01R 33/56518
USPC ................. 235/492, 375, 380, 382, 451, 493; 343/788, 867
See application file for complete search history.

(56) References Cited

U.S. PATENT DOCUMENTS

| | | | | |
|---|---|---|---|---|
| 7,333,786 | B2 * | 2/2008 | Kikuchi et al. | 455/130 |
| 7,876,284 | B2 * | 1/2011 | Mizoroki et al. | 343/895 |
| 2007/0138277 | A1 * | 6/2007 | Kazama et al. | 235/439 |
| 2007/0285255 | A1 | 12/2007 | Tsushima et al. | |

FOREIGN PATENT DOCUMENTS

| | | | |
|---|---|---|---|
| JP | 2004-145453 | A | 5/2004 |
| JP | 2007-328634 | A | 12/2007 |

* cited by examiner

*Primary Examiner* — Sonji Johnson
(74) *Attorney, Agent, or Firm* — Sony Corporation

(57) ABSTRACT

Provided is a non-contact communication device including an antenna configured to transmit data through non-contact communication after load-modulation of an RF signal from a reader/writer (R/W), wherein the antenna includes: a standard coil having an aperture with a predetermined size; and a small coil having an aperture with a size smaller than a size of the standard coil, wherein the standard coil and the small coil are connected in series or in parallel, and the small coil is arranged such that the aperture of the small coil overlaps a winding part of a coil that is an antenna of the R/W when the non-contact communication device is caused to face the R/W by matching a predetermined position of the non-contact communication device with a reference position of the R/W determined in advance as a position with which the predetermined position of the non-contact communication device is to be matched.

7 Claims, 18 Drawing Sheets

RELATION BETWEEN COMMUNICATION DISTANCE AND ANTENNA APERTURE AREA

FIG.4

| fo [MHz] | CORRECT COMMUNICATION RATE: OFFSET AMOUNT UNIT: mm | | | | |
|---|---|---|---|---|---|
| | (5, 0) | (0, 0) | (−5, 0) | (0, 5) | (0, −5) |
| 13.6 | 100.0% | 100.0% | 100.0% | 100.0% | 100.0% |
| 13.7 | 100.0% | 100.0% | 100.0% | 100.0% | 100.0% |
| 13.9 | 0.0% | 0.0% | 0.0% | 100.0% | 100.0% |
| 14.0 | 0.0% | 0.0% | 0.0% | 100.0% | 100.0% |
| 14.1 | 0.0% | 0.0% | 0.0% | 100.0% | 38.0% |
| 14.2 | 0.0% | 0.0% | 0.0% | 50.0% | 44.0% |
| 14.3 | 0.0% | 0.0% | 0.0% | 38.0% | 32.0% |
| 14.4 | 0.0% | 0.0% | 0.0% | 42.0% | 44.0% |

FIG.5

| IC CARD | | COMMUNICATION DEAD ZONE (THERE IS OFFSET) | | COMMUNICATION DISTANCE |
|---|---|---|---|---|
| fo[MHz] | ANTENNA APERTURE AREA [$cm^2$] | UNNECESSARY RADIATION DEVICE | ON-TOP DEVICE | STRONG ELECTRIC FIELD DEVICE |
| 14.3 | 39 | PRESENT (WITHIN 0 TO 5 mm) | PRESENT (0 mm) | EQUAL TO OR MORE THAN 100 mm |
| 14.3 | 36 | PRESENT (WITHIN 0 TO 5 mm) | ABSENT | EQUAL TO OR MORE THAN 100 mm |
| 14.3 | 34 | PRESENT (WITHIN 0 TO 5 mm) | ABSENT | EQUAL TO OR MORE THAN 100 mm |
| 14.3 | 30 | PRESENT (WITHIN 0 TO 5 mm) | ABSENT | EQUAL TO OR MORE THAN 100 mm |
| 14.3 | 26 | PRESENT (WITHIN 0 TO 5 mm) | ABSENT | EQUAL TO OR MORE THAN 100 mm |

FIG.16

| fo [MHz] | CORRECT COMMUNICATION RATE: OFFSET AMOUNT UNIT: mm | | | | |
|---|---|---|---|---|---|
| | (5, 0) | (0, 0) | (−5, 0) | (0, 5) | (0, −5) |
| 13.6 | 100.0% | 100.0% | 100.0% | 100.0% | 100.0% |
| 13.7 | 100.0% | 100.0% | 100.0% | 100.0% | 100.0% |
| 13.9 | 100.0% | 100.0% | 100.0% | 100.0% | 100.0% |
| 14.0 | 100.0% | 100.0% | 100.0% | 100.0% | 100.0% |
| 14.1 | 100.0% | 100.0% | 100.0% | 100.0% | 100.0% |
| 14.2 | 100.0% | 100.0% | 100.0% | 100.0% | 100.0% |
| 14.3 | 100.0% | 100.0% | 100.0% | 100.0% | 100.0% |
| 14.4 | 100.0% | 100.0% | 100.0% | 100.0% | 100.0% |

FIG.17

| IC CARD | | | COMMUNICATION DEAD ZONE (THERE IS OFFSET) | | COMMUNICATION DISTANCE |
|---|---|---|---|---|---|
| NUMBER OF ANTENNA COILS | fo[MHz] | ANTENNA APERTURE AREA [$cm^2$] | UNNECESSARY RADIATION DEVICE | ON-TOP DEVICE | STRONG ELECTRIC FIELD DEVICE |
| ONE | 14.3 | 39 | PRESENT (WITHIN 0 TO 5 mm) | PRESENT (0 mm) | EQUAL TO OR MORE THAN 100 mm |
| ONE | 14.3 | 36 | PRESENT (WITHIN 0 TO 5 mm) | ABSENT | EQUAL TO OR MORE THAN 100 mm |
| ONE | 14.3 | 34 | PRESENT (WITHIN 0 TO 5 mm) | ABSENT | EQUAL TO OR MORE THAN 100 mm |
| ONE | 14.3 | 30 | PRESENT (WITHIN 0 TO 5 mm) | ABSENT | EQUAL TO OR MORE THAN 100 mm |
| ONE | 14.3 | 26 | PRESENT (WITHIN 0 TO 5 mm) | ABSENT | EQUAL TO OR MORE THAN 100 mm |
| THREE | 14.3 | 39 | ABSENT | ABSENT | EQUAL TO OR MORE THAN 100 mm |

FIG.18

| DIAMETER OF COIL | RESISTANCE VALUE OF COIL | PRESENCE OR ABSENCE OF COMMUNICATION DEAD ZONE OFFSET AMOUNT UNIT: mm | | | | | | COMMUNICATION DISTANCE |
|---|---|---|---|---|---|---|---|---|
| | | UNNECESSARY RADIATION DEVICE | | | | | ON-TOP DEVICE | STRONG ELECTRIC FIELD DEVICE |
| [mm] | [Ω] | (-10,0) | (0,0) | (10,0) | (0,10) | (0,-10) | (±5,±5) | OFFSET AMOUNT (0,0) |
| 0.100 | 4.1 | PRESENT | ABSENT | ABSENT | ABSENT | PRESENT | ABSENT | EQUAL TO OR MORE THAN 100 mm |
| 0.090 | 5.1 | PRESENT | ABSENT | ABSENT | ABSENT | PRESENT | ABSENT | EQUAL TO OR MORE THAN 100 mm |
| 0.065 | 10.1 | PRESENT | ABSENT | ABSENT | ABSENT | PRESENT | ABSENT | EQUAL TO OR MORE THAN 100 mm |
| 0.065 | 10.1 | PRESENT | ABSENT | ABSENT | ABSENT | PRESENT | ABSENT | EQUAL TO OR MORE THAN 100 mm |
| 0.060 | 11.9 | PRESENT | ABSENT | ABSENT | ABSENT | PRESENT | ABSENT | EQUAL TO OR MORE THAN 100 mm |
| 0.055 | 14.3 | PRESENT | ABSENT | ABSENT | ABSENT | ABSENT | ABSENT | EQUAL TO OR MORE THAN 100 mm |
| 0.045 | 20.9 | ABSENT | ABSENT | ABSENT | ABSENT | ABSENT | ABSENT | EQUAL TO OR MORE THAN 100 mm |

NON-CONTACT COMMUNICATION DEVICE

CROSS-REFERENCE TO RELATED APPLICATION

The present application claims priority from Japanese Patent Application No. JP 2011-174983 filed in the Japanese Patent Office on Aug. 10, 2011, the entire content of which is incorporated herein by reference.

BACKGROUND

The present technology relates to a non-contact communication device, and more particularly, to a non-contact communication device capable of improving communication performance of non-contact communication.

An integrated circuit (IC) card for exchanging data through non-contact communication is much more convenient to use than a medium (for example, a magnetic card) in which data reading/writing is performed in a contact state. In recent years, for example, since the IC card has been widely utilized in ticket systems of railroad systems and the like, electronic money systems for payment in stores such as convenience stores, entrance and exit systems for managing entrances and exits to/from rooms of a company, etc. demands therefor have increased more and more.

For example, an IC card of an entrance and exit system has an IC chip with an entrance and exit ID (identification) as information for identifying a user possessing the IC card, and a photograph of a user's face and/or a name is displayed on the surface thereof.

In the entrance and exit system, a reader/writer (R/W) is installed around a doorway of a room to perform non-contact communication with the IC card, and if a user passes the IC card over the R/W, data exchange and other processes are quickly performed between the IC card and the R/W through non-contact communication in order to permit the entrance and exit to/from the room.

Non-contact communication devices for performing non-contact communication with the R/W include a portable terminal such as a cellular phone having a function of the IC card, a token-shaped IC tag (a wireless tag) in which the top and bottom of an IC chip are sandwiched by a resin case, and the like in addition to a card-shaped IC card, and the portable terminal or the IC tag has also been spread as a non-contact communication device, in addition to the IC card.

Here, a communication device performing non-contact communication will also be referred to as a non-contact communication device.

Both the R/W and the IC card, which transmit data to each other through non-contact communication, are non-contact communication devices.

The R/W outputs a radio frequency (RF) signal by itself, modulates the RF signal, and transmits data.

Meanwhile, for example, the IC card and the like having no power supply is driven by obtaining power from the RF signal output from the R/W, and load-modulates the RF signal to transmit data.

Hereinafter, a non-contact communication device such as the R/W, which outputs an RF signal and modulates the RF signal to transmit data, will also be appropriately referred to as an initiator, and a non-contact communication device such as the IC card, which is driven by obtaining power from the RF signal output from the initiator and load-modulates the RF signal to transmit data, will also be referred to as a target.

The IC card and the like serving as the target include electronic parts such as an IC chip, one (loop) coil, or a capacitor.

That is, in the IC card, for example, the IC chip, the capacitor and the like are connected to the coil as an antenna. If the IC card approaches the R/W and the like serving as the initiator, current flows through the coil serving as the antenna of the IC card due to electromagnetic induction by the RF signal output from the R/W, and the IC chip connected to the coil is driven by power obtained from the current.

In addition, by the capacitor connected to the coil serving as the antenna, a resonance frequency of a resonance circuit including the capacitor and the coil is adjusted.

For example, Japanese Unexamined Patent Application Publication No. 2007-328634 has proposed an R/W capable of simply adjusting a resonance frequency by closely electromagnetically coupling a main antenna coil and a sub-antenna coil to each other such that a coupling coefficient approaches 1 to a maximum extent, wherein the main antenna coil and the sub-antenna coil are not directly electrically connected to each other.

Furthermore, for example, Japanese Unexamined Patent Application Publication No. 2004-145453 has proposed an IC module which allows a single semiconductor circuit chip to integrally have an R/W function and an IC card function through a first loop antenna connected to an input/output terminal of a card IC function unit, and a second loop antenna connected to an input/output terminal of a reader/writer function unit and arranged inside the first loop antenna.

SUMMARY

Meanwhile, in recent years, the R/W is prepared in the form of a module and a module of the R/W (an R/W module) is installed in various devices, thereby serving as the R/W as a whole in many cases.

Since an antenna of the R/W module installed in a device has various shapes and sizes, it may be difficult for the R/W module to ensure constant communication performance with respect to the IC card and the like serving as a target.

Furthermore, when the R/W module, for example, is installed in a so-called notebook personal computer (PC), only a vicinity of the antenna of the R/W module in the notebook PC is formed by a resin casing, and other parts, that is, parts slightly separated from the antenna (parts outside the antenna), are formed by a metal casing in order to ensure physical strength.

Meanwhile, since the IC card and the like serving as a target are designed and manufactured in consideration of non-contact communication on a free space (a state in which there is no surrounding metallic body), when parts outside the antenna of the R/W module are formed by the metal casing, it is probable that communication performance between the IC card and the R/W (the notebook PC having the R/W module therein) may significantly deteriorate under the influence of the metal casing.

Moreover, since the R/W may be an R/W causing unnecessary radiation noise, communication performance between the IC card and the R/W may deteriorate due to the unnecessary radiation noise.

In light of the foregoing, it is desirable to improve communication performance of non-contact communication.

A non-contact communication device of the present technology includes an antenna configured to transmit data through non-contact communication after load-modulation of an RF signal from a reader/writer (R/W), wherein the antenna includes: a standard coil having an aperture with a predetermined size; and a small coil having an aperture with a size smaller than a size of the standard coil, wherein the standard coil and the small coil are connected in series or in parallel, and the small coil is arranged such that the aperture of the small coil overlaps a winding part of a coil that is an antenna of the R/W when the non-contact communication device is caused to face the R/W by matching a predetermined position of the non-contact communication device with a reference position of the R/W that is determined in advance as a position with which the predetermined position of the non-contact communication device is to be matched in causing the non-contact communication device to face the R/W.

In the non-contact communication device of the present technology, there is provided the antenna in which the standard coil and the small coil are connected in series or in parallel, wherein the standard coil has the aperture with the predetermined size and the small coil has the aperture with the size smaller than the size of the standard coil. The small coil is arranged such that the aperture of the small coil overlaps a winding part of a coil that is an antenna of the R/W when the non-contact communication device is caused to face the R/W by matching a predetermined position of the non-contact communication device with a reference position of the R/W that is determined in advance as a position with which the predetermined position of the non-contact communication device is to be matched in causing the non-contact communication device to face the R/W.

In addition, the non-contact communication device may be an independent device, or may be an internal block constituting one device.

According to the present technology, it is possible to improve communication performance of non-contact communication.

BRIEF DESCRIPTION OF THE DRAWINGS

FIG. 4 is a diagram illustrating a correct communication rate of an IC card 10 with respect to each offset amount (x, y);

FIG. 5 is a diagram illustrating the presence or absence of a communication dead zone, which indicates whether the communication dead zone occurs in the IC card 10;

FIG. 16 is a diagram illustrating a correct communication rate for each offset amount (x, y) of the 3-coil card 112;

FIG. 17 is a diagram illustrating the presence or absence of a communication dead zone, which indicates whether the communication dead zone occurs in the 3-coil card 112; and FIG. 18 is a diagram illustrating the presence or absence of a communication dead zone, which indicates whether the communication dead zone occurs in the 3-coil card 112.

DETAILED DESCRIPTION OF THE EMBODIMENTS

Figure 1:
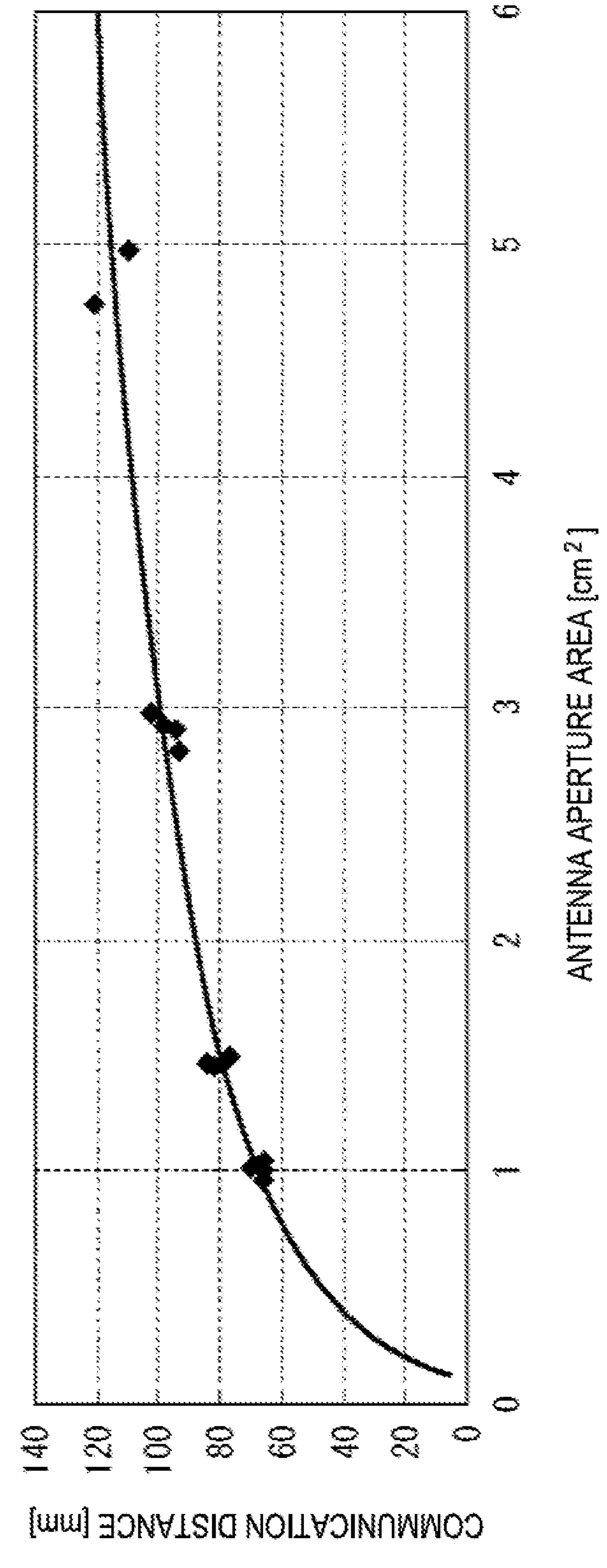
FIG. 1 is a diagram illustrating a communication distance between a strong electric field-type R/W and an IC card having a different antenna aperture area of an aperture of a coil serving as an antenna.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

[Communication Performance]

Hereinafter, among targets, an IC card will be mainly described. However, the present technology can be applied to a portable terminal having the function of the IC card, an IC tag, and other targets for load-modulating an RF signal to transmit data, in addition to the IC card.

Communication performance of an IC card and the like serving as a target for performing non-contact communication, for example, includes a communication distance for allowing non-contact communication to be performed between the IC card and an R/W in the case in which the IC card is passed over the R/W, and offset characteristics indicating tolerance against position shift (offset) of the IC card from an ideal position of the IC card with respect to the R/W in the case in which the IC card is used while being directly placed on the R/W (making close contact with the R/W).

The IC card is required to ensure a communication distance to a certain degree, and to have offset characteristics for enabling non-contact communication between the IC card and the R/W even when the IC card is placed on the R/W in the state in which the IC card has been offset from the ideal position to a certain degree.

Here, superior offset characteristics mean that the non-contact communication is possible between the IC card and the R/W even when the IC card has been offset from the ideal position to a certain degree.

FIG. 1 is a diagram illustrating a communication distance between a strong electric field-type R/W and an IC card having a different antenna aperture area of an aperture of a coil serving as an antenna.

In FIG. 1, a horizontal axis denotes the antenna aperture area of the IC card and a vertical axis denotes the communication distance.

Referring to FIG. 1, it can be understood that the communication distance is increased in proportion to the antenna aperture area.

Here, the strong electric field-type R/W is an R/W that outputs an RF signal of a large level equal to or more than a certain level, and will also be referred to as a strong electric field device in the following description.

Meanwhile, the offset characteristics indicate communication performance needed to ensure a certain degree of efficiency in non-contact communication with the R/W (hereinafter, also referred to as an on-top device) on which the IC card is directly placed. However, in the on-top device, as with the aforementioned notebook PC, only a vicinity of the antenna of the R/W module is formed by a resin casing, and other parts are formed by a metal casing.

Figure 2:
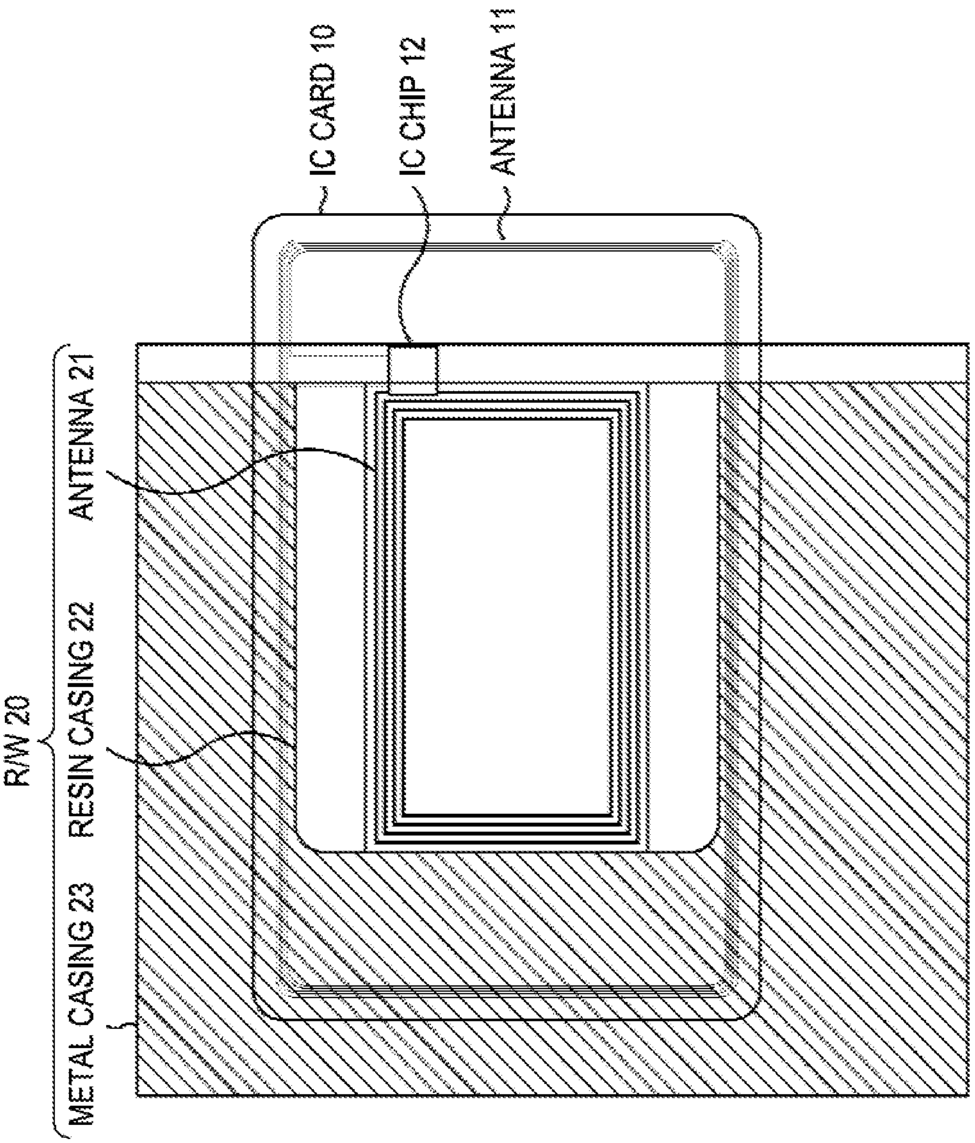
FIG. 2 is a plan view illustrating a state in which an IC card is placed on an R/W which is an on-top device.

FIG. 2 is a plan view illustrating a state in which the IC card is placed on the R/W which is the on-top device.

FIG. 2 illustrates a state in which an IC card 10 is placed on an R/W 20 which is the on-top device.

The IC card 10 has one coil as an antenna 11 and an IC chip 12 therein.

In addition, FIG. 2 illustrates the antenna 11 and the IC chip 12 to be seen. However, the antenna 11 and the IC chip 12 are actually not seen because they are embedded in the IC card 10.

The R/W 20, which is an on-top device, has an R/W module (not illustrated) therein.

In FIG. 2, in the R/W 20, a vicinity (an aperture of a coil, a winding part of the coil, and a part of an outer side (a side other than the aperture) of the winding part while making contact with the winding part) of the (one) coil which is an antenna 21 of the R/W module is formed by a resin casing 22, and other parts are formed by a metal casing 23.

In addition, FIG. 2 illustrates the antenna 21 (of the R/W module) of the R/W 20 to be seen. However, the antenna 21 is actually not seen because it is provided inside the resin casing 22 (the R/W 20).

As illustrated in FIG. 2, when an antenna aperture area of the antenna 11 of the IC card 10 is larger than an antenna aperture area of the antenna 21 of the R/W 20, mutual coupling between the antennas 11 and 21 is weakened due to the difference between a size (the antenna aperture area) of the antenna 11 of the IC card 10 and a size of the antenna 21 of the R/W 20, or overlapping of the antenna 11 of the IC card 10 to the metal casing 23, resulting in a positional relation between the IC card 10 and the R/W 20, in which non-contact communication is not possible between the IC card 10 and the R/W 20.

Here, the positional relation between the IC card 10 and the R/W 20 in which the non-contact communication is not possible between the IC card 10 and the R/W 20, that is, the position of the IC card 10 with respect to the R/W 20, is also called a communication dead zone.

In addition, the R/W 20, which is an on-top device, is drawn with an indication mark serving as an indication of a position when the IC card 10 is placed thereon, and when a predetermined position of the IC card 10 is matched with the position (an indication mark position: a reference position) of the indication mark and then the IC card 10 is placed on the R/W 20, the position of the IC card 10 with respect to the R/W 20 is an ideal position.

Hereinafter, the amount of position shift (offset) of the IC card 10 from the ideal position of the IC card 10 will be also referred to as an offset amount, and the offset amount is expressed by an xy coordinate of a two-dimensional coordinate system employing the indication mark position of the R/W 20 as the origin.

Figure 3:
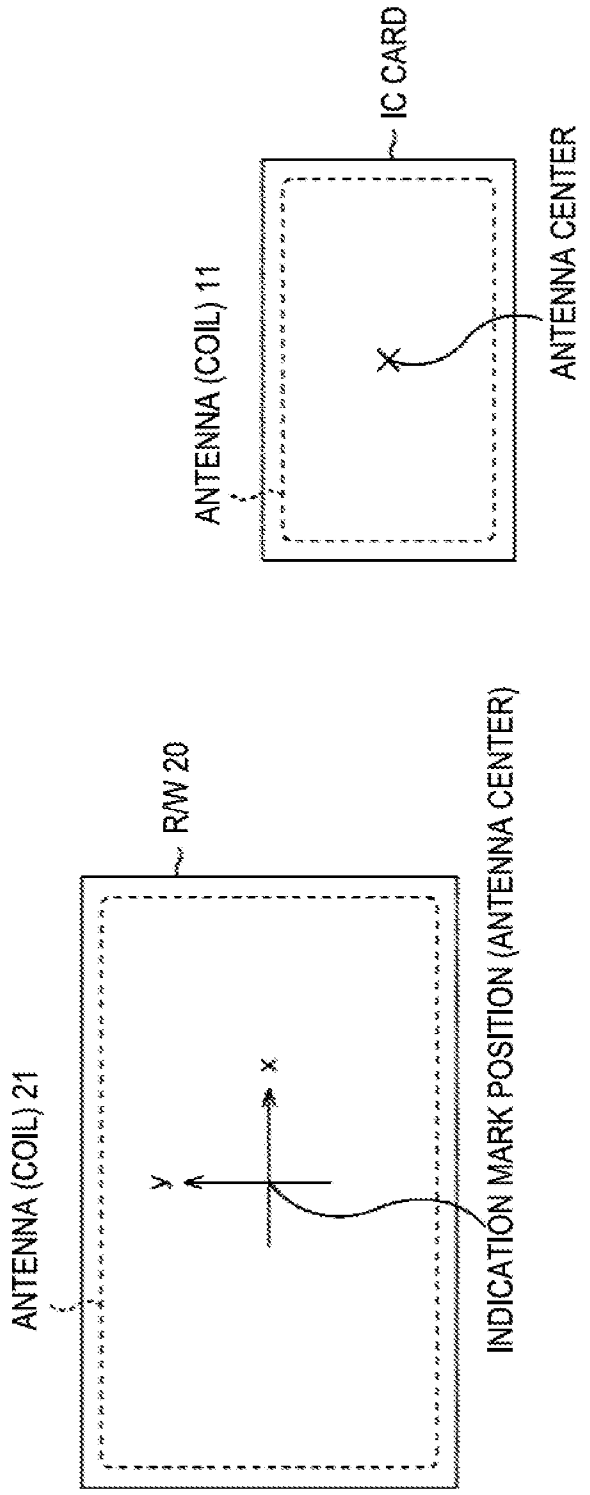
FIG. 3 is a diagram describing an offset amount.

FIG. 3 is a diagram describing the offset amount.

The indication mark position of the R/W 20 is a reference position of the R/W 20 determined in advance as a position with which the predetermined position of the IC card 10 is to be matched, when the IC card 10 is allowed to face the R/W 20.

Here, if the center of a coil aperture, from which magnetic flux occurs in the antenna (the coil), is defined as an antenna center, the antenna center of the antenna 11 of the IC card 10, for example, is employed as the predetermined position of the IC card 10 to be matched with the indication mark position of the R/W 20, and the antenna center of the antenna 21 of the R/W 20, for example, is employed as the indication mark position (the reference position) of the R/W 20.

In the following description, as illustrated in FIG. 3, a two-dimensional coordinate system is defined, in which the indication mark position is employed as the origin, a horizontal axis denotes an x axis, and a vertical axis denotes a y axis.

In this case, the offset amount is expressed by a coordinate (x, y) on the two-dimensional coordinate system of the antenna center as the predetermined position of the IC card 10 when the IC card 10 is placed on the R/W 20 which is the on-top device.

In addition, in the present embodiment, for the purpose of convenience, the IC card 10 is assumed to be placed on the R/W 20 such that a transverse direction of the IC card 10 is parallel to the x axis on the two-dimensional coordinate system of the R/W 20 and a longitudinal direction of the IC card 10 is parallel to the y axis on the two-dimensional coordinate system of the R/W 20, and when the IC card 10 has rotated about an axis vertical to the two-dimensional coordinate system of the R/W 20, the IC card 10 is assumed not to be placed on the R/W 20.

Furthermore, in the present embodiment, a unit of coordinates x and y as the offset amount (x, y) is assumed to be mm (millimeter).

FIG. 4 is a diagram illustrating a correct communication rate of the IC card 10 with respect to each offset amount (x, y) when a resonance frequency fo of the IC card 10 has been set as each frequency.

In FIG. 4, the correct communication rate represents a rate by which data exchange has succeeded between the IC card 10 and the R/W 20.

In addition, the resonance frequency fo of the IC card 10, for example, can be set as various frequencies by adjusting the capacitance of the capacitor (not illustrated) connected to the antenna 21 of the IC card 10.

In FIG. 4, five types of offset amounts (offset positions) (5,0), (0, 0), (−5,0), (0,5), and (0,−5) are employed as the offset amount (x, y), and eight types of frequencies in the range of 13.6 MHz to 14.4 MHz at intervals of 0.1 MHz are employed as the resonance frequency fo.

Referring to FIG. 4, if the resonance frequency fo of the IC card 10 is equal to or more than 13.9 MHz, since it is possible to check the occurrence of a communication dead zone (a correct communication rate smaller than 100%) using three of the five types of offset amounts, it cannot be said that the offset characteristics are good.

For example, as illustrated FIG. 2, when the size (in FIG. 2, the size of the aperture of one coil serving as the antenna 11) of the antenna 11 of the IC card 10 is larger than the size of the antenna 21 of the R/W 20, if the communication distance of the IC card 10 is sufficient, the antenna aperture area of the IC card 10 is allowed to be reduced, so that it is possible to improve the offset characteristics.

However, if the antenna aperture area of the IC card 10 is allowed to be reduced, although the offset characteristics are improved, a communication distance is reduced (shortened).

Since the offset characteristics of the IC card 10 are improved by reducing the antenna aperture area of the IC card 10 and the communication distance of the IC card 10 is improved by increasing the antenna aperture area of the IC card 10, that is, since the offset characteristics and the communication distance of the IC card 10 are in a trade-off relation, it is difficult to improve both the offset characteristics and the communication distance of the IC card 10 only by adjusting the antenna aperture area of the IC card 10.

Furthermore, the communication dead zone may occur due to unnecessary radiation noise of the R/W 20 as well as the position shift (offset) of the IC card 10.

The communication dead zone due to the unnecessary radiation noise is likely to be mitigated by adjusting the shape, the size (the antenna aperture area), the arrangement (position), the inductance and the like of the coil serving as the antenna 11 of the IC card 10. However, through such adjustment, it is difficult to improve all of the communication distance, the offset characteristics, and tolerance (robustness such that non-contact communication can be performed in spite of the unnecessary radiation noise) of the unnecessary radiation noise (the communication dead zone due to the unnecessary radiation noise).

FIG. 5 is a diagram illustrating the presence or absence of the communication dead zone, which indicates whether the communication dead zone occurs in the IC cards 10 having various antenna aperture areas.

In addition, in FIG. 5, the resonance frequencies fo of the IC cards 10 are set to 14.3 MHz, and five types of antenna aperture areas 39, 36, 34, 30, and 26 $mm^2$ are employed as the antenna aperture area.

Moreover, in FIG. 5, as an R/W for performing non-contact communication with the IC cards 10, an R/W (hereinafter, also referred to as an unnecessary radiation device) causing the unnecessary radiation noise of a predetermined level or more has been employed, in addition to the R/W 20 serving as the on-top device.

In addition, there is no unnecessary radiation noise of the on-top device, or the unnecessary radiation noise is at a negligible level.

Furthermore, FIG. 5 also illustrates communication distances when the IC cards 10 perform non-contact communication with the R/W, which is a strong electric field device, in addition to the presence or absence of the communication dead zone.

In FIG. 5, all of the IC cards 10 having the antenna aperture areas 39, 36, 34, 30, and 26 $mm^2$ ensure a communication distance of 100 mm or more with respect to the strong electric field device.

Here, in the non-contact communication between the IC cards 10 and the unnecessary radiation device, the presence or absence of the communication dead zone has been examined by employing five types of offset amounts (0, 0), (10,0), (−10,0), (0,10), and (0,−10).

Furthermore, in the non-contact communication between the IC cards 10 and the on-top device, the presence or absence of the communication dead zone has been examined by employing five types of offset amounts (0, 0), (5,0), (−5,0), (0,5), and (0,−5).

Moreover, the communication distance between the IC cards 10 and the strong electric field device has been measured by employing an offset amount (0, 0).

In FIG. 5, "Present" indicates the occurrence of the communication dead zone and "Absent" indicates the non-occurrence of the communication dead zone.

Referring to FIG. 5, the antenna aperture areas of the IC cards 10 are allowed to be reduced in the range in which it is possible to ensure 100 mm or more as the communication distance to the strong electric field device, thereby preventing the occurrence of the communication dead zone due to the offset in the non-contact communication with the on-top device, that is, the offset characteristics are improved. However, in the non-contact communication with the unnecessary radiation device, it can be understood that the communication dead zone due to the unnecessary radiation noise occurs.

As described above, the antenna aperture areas of the IC cards 10 are allowed to be reduced, so that the communication distance is shortened to a certain degree and the offset characteristics are improved. However, it is difficult to prevent the occurrence of the communication dead zone due to the unnecessary radiation noise, that is, to improve tolerance against the unnecessary radiation noise.

In addition, the antenna 11 of the IC card 10 of FIG. 2 is a coil having an antenna aperture area of 39 $mm^2$ in the record of the first row (from the top) of FIG. 5, and the correct communication rate of FIG. 4 is a value measured by using the coil having the antenna aperture area of 39 $mm^2$ as the antenna 11 of the IC card 10.

As described above, in the IC card 10 employing one coil as the antenna 11, it is difficult to improve both the offset characteristics and the tolerance of the unnecessary radiation noise while maintaining the communication distance.

In light of the foregoing, the present technology proposes a non-contact communication device as a target capable of easily improving both the offset characteristics and the tolerance of the unnecessary radiation noise while maintaining the communication distance.

[One Embodiment of Communication System Employing Present Technology]

Figure 6:
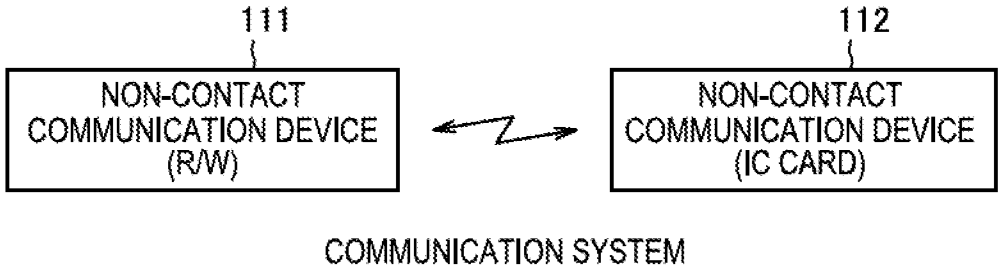
FIG. 6 is a diagram illustrating a configuration example of an embodiment of a communication system employing the present technology.

FIG. 6 is a diagram illustrating a configuration example of an embodiment of a communication system (a system includes a plurality of devices logically aggregated, and whether the devices having the configurations are in the same casing is not relevant) employing the present technology.

In FIG. 6, the communication system includes non-contact communication devices 111 and 112 configured to perform non-contact communication with each other.

In addition, in the embodiment of FIG. 6, for the purpose of convenience, the non-contact communication device 111 only serves as an initiator configured to output an RF signal, and modulates the RF signal to transmit the data, and the non-contact communication device 112 only serves as a target configured to load-modulate the RF signal output from the initiator and transmit data.

The non-contact communication device 111 serving as the initiator, for example, is an R/W, and the non-contact communication device 112 serving as the target, for example, is an IC card.

Figure 7:
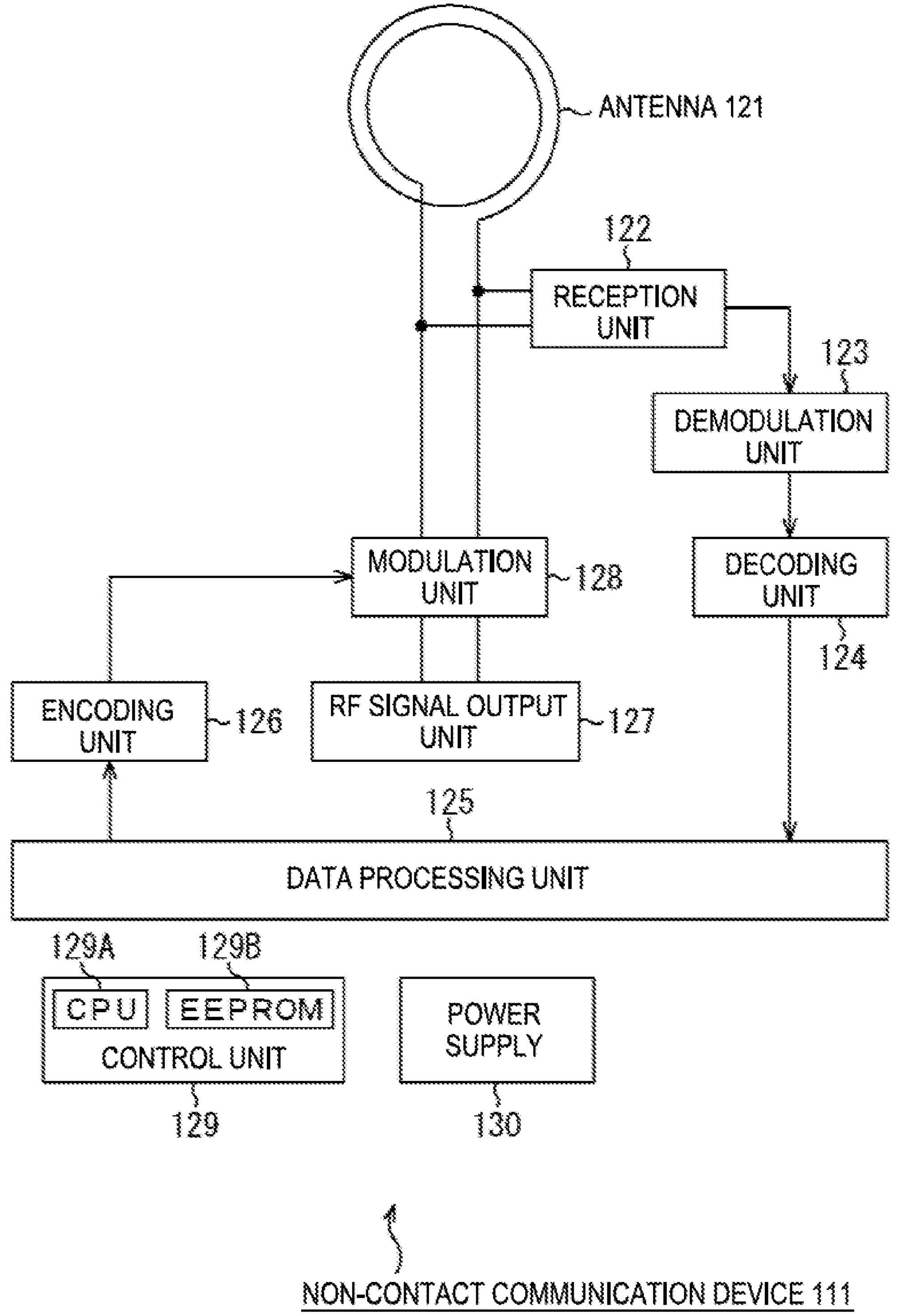
FIG. 7 is a block diagram illustrating an electrical configuration example of a non-contact communication device (R/W) 111.

FIG. 7 is a block diagram illustrating an electrical configuration example of the non-contact communication device 111 serving as the R/W of FIG. 6.

An antenna 121 includes a coil and the like, and outputs an RF signal using a change in current flowing through the coil. Furthermore, magnetic flux passing through the coil serving as the antenna 121 is changed, so that current flows through the antenna 121.

A reception unit 122 is configured to receive the current flowing through the antenna 121 and outputs the current to a demodulation unit 123. The demodulation unit 123 demodulates a signal supplied from the reception unit 122 (for example, performs Amplitude Shift Keying (ASK) demodulation), and supplies a decoding unit 124 with a demodulated signal obtained by demodulating the above signal. The decoding unit 124 decodes the demodulated signal supplied from the demodulation unit 123, for example, a Manchester code and the like, and supplies a data processing unit 125 with data obtained by decoding the demodulated signal.

The data processing unit 125 performs a predetermined process based on the data supplied from the decoding unit 124. Furthermore, the data processing unit 125 supplies an encoding unit 126 with data to be transmitted to other devices such as the non-contact communication device 112.

The encoding unit 126 encodes the data, which is supplied from the data processing unit 125, into, for example, a Manchester code and the like, and outputs the Manchester code to a modulation unit 128.

An RF signal output unit 127 allows current to flow through the antenna 121, wherein the current is used to radiate a carrier (an RF signal) with a predetermined single frequency $f_c$ from the antenna 121. The modulation unit 128 adjusts the carrier as the current, which flows through the antenna 121 by the RF signal output unit 127, according to the signal supplied from the encoding unit 126. In this way, an RF signal, which is obtained by modulating the carrier according to the data (the Manchester code obtained by encoding the data) output from the data processing unit 125 to the encoding unit 126, is radiated from the antenna 121 as a modulation signal.

Here, as a modulation scheme of the modulation unit 128, for example, Amplitude Shift Keying (ASK) can be employed. However, the modulation scheme of the modulation unit 128 is not limited to ASK. For example, it is possible to employ Phase Shift Keying (PSK), Quadrature Amplitude Modulation (QAM), and the like. Furthermore, a modulation degree of amplitude is also not limited to a numerical value such as 8%, 30%, 50%, or 100%. For example, appropriate values can be selected.

A control unit 129 performs control and the like with respect to the blocks constituting the non-contact communication device 111. That is, the control unit 129, for example, includes a central processing unit (CPU) 129A, an electrically erasable programmable read only memory (EEPROM) 129B, a random access memory (RAM, not illustrated), and the like. The CPU 129A executes a program stored in the EEPROM 129B, thereby controlling the blocks constituting the non-contact communication device 111 and performing various processes. The EEPROM 129B stores the program to be executed by the CPU 129A, or data necessary for the operation of the CPU 129A.

In addition, a series of processes performed by the program executed by the CPU 129A can be performed by dedicated software provided instead of the CPU 129A. Furthermore, the program executed by the CPU 129A can not only be installed in the EEPROM 129B in advance, but can also be temporarily or permanently stored (recorded) on a flexible disk, a compact disc read only memory (CD-ROM), a magneto optical (MO) disc, a digital versatile disc (DVD), a magnetic disk, or a removable recording medium such as a semiconductor memory, so that the program can be provided as so-called packaged software. Moreover, the program can be transmitted to the non-contact communication device 111 through proximity communication, and can be installed in the EEPROM 129B.

A power supply 130 supplies desired power to the blocks constituting the non-contact communication device 111.

In addition, FIG. 7 does not illustrate a line along which the control unit 129 controls the blocks constituting the non-contact communication device 111, or a line along which the power supply 130 supplies the power to the blocks constituting the non-contact communication device 111, in order to avoid the complication of the diagram.

Furthermore, in the aforementioned case, the decoding unit 124 and the encoding unit 126 process the Manchester code. However, the decoding unit 124 and the encoding unit 126, for example, can select and process one from a plurality of types of codes such as modified Miller codes or non-return to zero (NRZ) codes, as well as the Manchester code.

In the non-contact communication device 111 configured as above, the control unit 129 serve as the R/W, which is an initiator, by controlling each block of the non-contact communication device 111.

That is, in the non-contact communication device 111 (hereinafter, also referred to as the R/W 111) serving as an R/W, when data (a frame) is transmitted, the RF signal output unit 127 allows the current to flow through the antenna 121, the current being used to radiate the carrier with the predetermined single frequency $f_c$ from the antenna 121, so that the RF signal is radiated from the antenna 121 as the carrier (a non-modulated wave).

Furthermore, in the R/W 111, the data processing unit 125 supplies the encoding unit 126 with data to be transmitted to the target, and the encoding unit 126 encodes the data supplied from the data processing unit 125 into the Manchester code and outputs the Manchester code to the modulation unit 128. The modulation unit 128 modulates the carrier as the current, which flows through the antenna 121 by the RF signal output unit 127, according to the signal supplied from the encoding unit 126. In this way, the RF signal, which is obtained by modulating the carrier according to the data output from the data processing unit 125 to the encoding unit 126, is radiated from the antenna 121, so that data is transmitted to the target.

Meanwhile, in the R/W 111, when data (a frame) transmitted from the target through load modulation is received, the reception unit 122 outputs a signal, which corresponds to the current on the antenna 121 and is changed by the load modulation of the target, to the demodulation unit 123. The demodulation unit 123 demodulates the signal supplied from the reception unit 122, and supplies the demodulated signal to the decoding unit 124. The decoding unit 124 decodes the Manchester code and the like as the signal supplied from the demodulation unit 123, and supplies the data processing unit 125 with the data obtained by decoding the signal. The data processing unit 125 performs a predetermined process based on the data supplied from the decoding unit 124.

Figure 8:
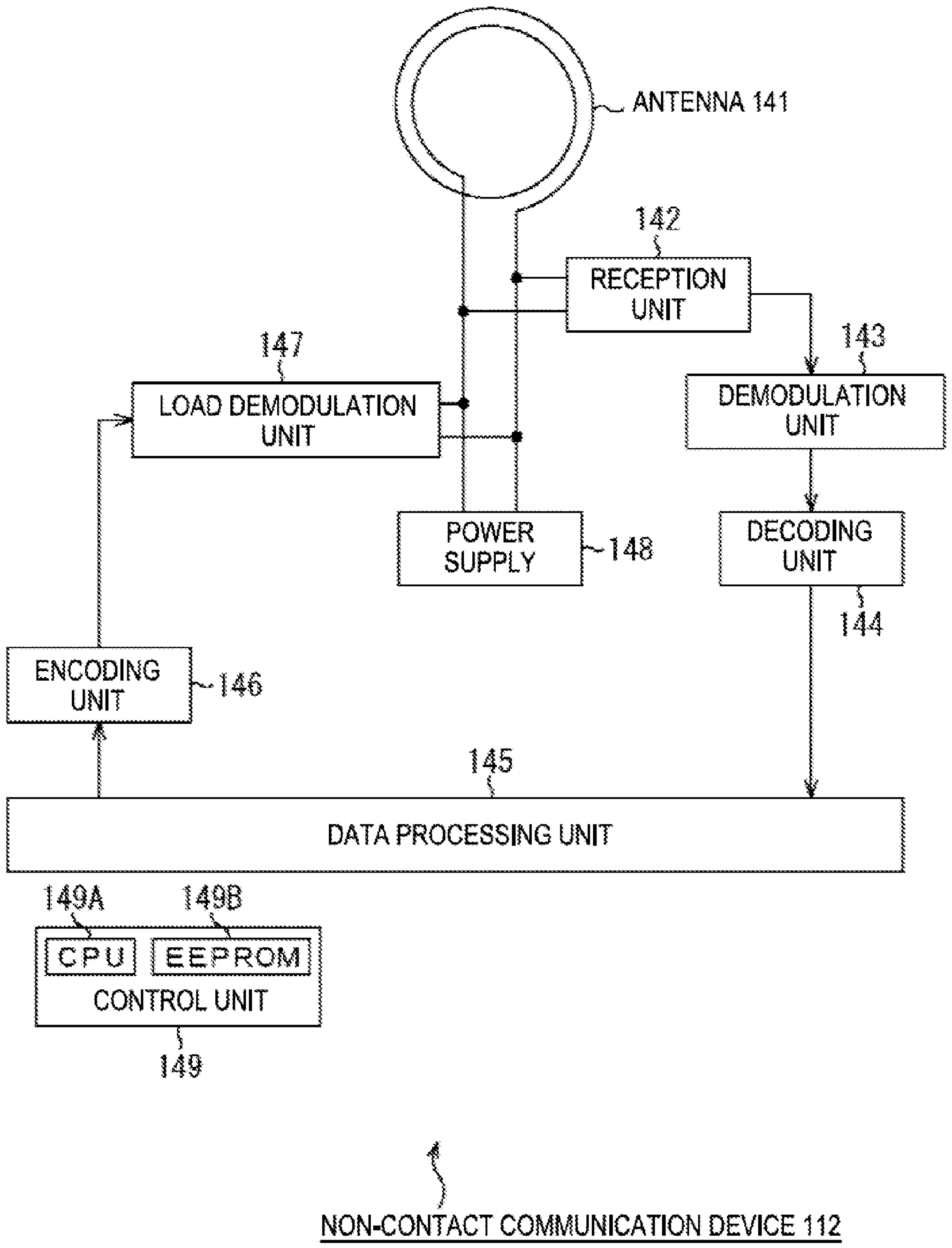
FIG. 8 is a block diagram illustrating an electrical configuration example of a non-contact communication device (an IC card) 112.

FIG. 8 is a block diagram illustrating an electrical configuration example of the non-contact communication device 112 serving as the IC card of FIG. 6.

An antenna 141 includes a coil and the like, and outputs an RF signal using a change in current flowing through the coil. Furthermore, magnetic flux passing through the coil which is the antenna 141 is changed, so that current flows through the antenna 141.

A reception unit 142 is configured to receive the current flowing through the antenna 141 and outputs the current to a demodulation unit 143. The demodulation unit 143 performs ASK demodulation with respect to a signal supplied from the reception unit 142, and supplies a decoding unit 144 with a demodulated signal. The decoding unit 144 decodes the demodulated signal supplied from the demodulation unit 143, for example, a Manchester code and the like, and supplies a data processing unit 145 with data obtained by decoding the demodulated signal.

The data processing unit 145 performs a predetermined process based on the data supplied from the decoding unit 144. Furthermore, the data processing unit 145 supplies an encoding unit 146 with data to be transmitted to other devices such as the non-contact communication device 111.

The encoding unit 146 encodes the data, which is supplied from the data processing unit 145, into, for example, a Manchester code and the like, and outputs the Manchester code to a load modulation unit 147.

The load modulation unit 147 changes the impedance of the coil serving as the antenna 141 when viewed from an exterior according to the signal supplied from the encoding unit 146. When an RF field (a magnetic field) is formed around the antenna 141 by an RF signal output from other devices as a carrier, the impedance of the coil serving as the antenna 141 is changed, so that the RF field around the antenna 141 is also changed. In this way, the carrier as the RF signal output from other devices is modulated (load-modulated) according to the signal supplied from the encoding unit 146, and the data output from the data processing unit 145 to the encoding unit 146 is transmitted to other devices which output the RF signal.

Here, as a modulation scheme of the load modulation unit 147, for example, Amplitude Shift Keying (ASK) can be employed. However, the modulation scheme of the load modulation unit 147 is not limited to ASK. For example, it is possible to employ PSK, QAM, and the like. Furthermore, a modulation degree of amplitude is also not limited to a numerical value such as 8%, 30%, 50%, or 100%. For example, appropriate values can be selected.

A power supply 148 obtains power from the current flowing through the antenna 141 by the RF field formed around the antenna 141, and supplies the power to the blocks constituting the non-contact communication device 112.

A control unit 149 performs control and the like with respect to the blocks constituting the non-contact communication device 112. That is, the control unit 149, for example, includes a CPU 149A, an EEPROM 149B, a RAM (not illustrated), and the like. The CPU 149A executes a program stored in the EEPROM 149B, thereby controlling the blocks constituting the non-contact communication device 112 and performing various processes. The EEPROM 149B stores the program to be executed by the CPU 149A, or data necessary for the operation of the CPU 149A.

In addition, a series of processes performed by the program executed by the CPU 149A can be performed by dedicated software provided instead of the CPU 149A. Furthermore, the program executed by the CPU 149A can not only be installed in the EEPROM 149B in advance, but can also be temporarily or permanently stored (recorded) in a flexible disk, a CD-ROM, an MO disc, a DVD, a magnetic disk, or a removable recording medium such as a semiconductor memory, so that the program can be provided as so-called packaged software. Moreover, the program can be transmitted to the non-contact communication device 112 through proximity communication, and can be installed in the EEPROM 149B.

In addition, FIG. 8 does not illustrate a line along which the control unit 149 controls the blocks constituting the non-contact communication device 112, or a line along which the power supply 148 supplies the power to the blocks constituting the non-contact communication device 112 in order to avoid the complication of the diagram.

Furthermore, in FIG. 8, the power supply 148 obtains the power from the current flowing through the antenna 141. However, for example, a battery is embedded in the non-contact communication device 112, so that power can be supplied from the battery to the blocks constituting the non-contact communication device 112.

Furthermore, in the aforementioned case, the decoding unit 144 and the encoding unit 146 process the Manchester code. However, the decoding unit 144 and the encoding unit 146, for example, can select and process one from a plurality of types of codes such as modified Miller codes or NRZ codes, as well as the Manchester code.

In the non-contact communication device 112 configured as above, the control unit 149 serve as the target by controlling each block of the non-contact communication device 112.

That is, in the non-contact communication device 112 (hereinafter, also referred to as the IC card 112) serving as an IC card, when data (a frame) is transmitted, the data processing unit 145 supplies the encoding unit 146 with data to be transmitted to the initiator, and the encoding unit 146 encodes the data, which is supplied from the data processing unit 145, into the Manchester code and outputs the Manchester code to the load modulation unit 147. The load modulation unit 147 changes the impedance of the coil serving as the antenna 141 when viewed from an exterior according to the signal supplied from the encoding unit 146.

At this time, if the IC card 112 is adjacent to the R/W 111 and the RF field is formed around the antenna 141 by the RF signal output from the R/W 111 as the carrier, the impedance of the coil serving as the antenna 141 is changed, so that the RF field around the antenna 141 is also changed. In this way, the RF signal output from the R/W 111 is modulated (load-modulated) according to the signal supplied from the encoding unit 146, and the data output from the data processing unit 145 to the encoding unit 146 is transmitted to the R/W 111 which outputs the RF signal.

Meanwhile, in the IC card 112, when data (a frame), which is transmitted after the RF signal output from the R/W 111 as the carrier is modulated, is received, the reception unit 142 outputs a signal, which corresponds to the current flowing through the antenna 141 according to the RF signal modulated by the data, to the demodulation unit 143. The demodulation unit 143 demodulates the signal supplied from the reception unit 142, and supplies the demodulated signal to the decoding unit 144. The decoding unit 144 decodes the Manchester code and the like as the signal supplied from the demodulation unit 143, and supplies the data processing unit 145 with the data obtained by decoding the signal. The data processing unit 145 performs a predetermined process based on the data supplied from the decoding unit 144.

[Physical Configuration Example of IC Card]

Figure 9:
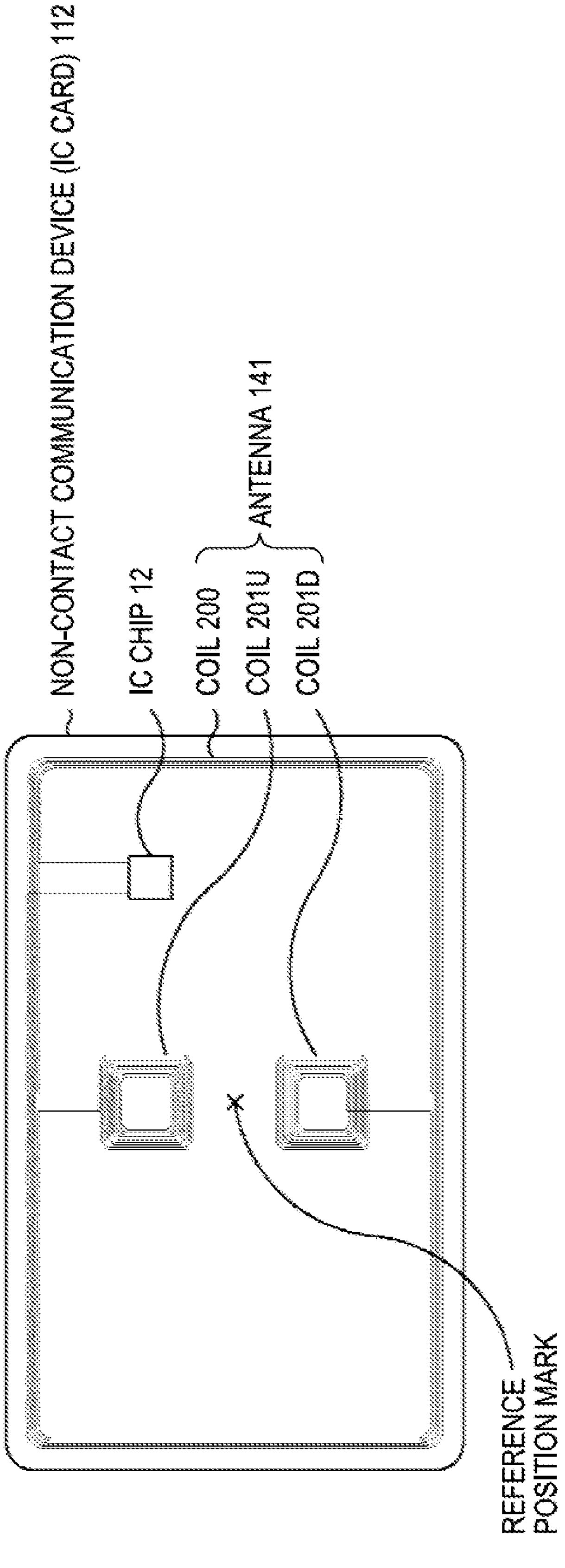
FIG. 9 is a plan view illustrating a physical configuration example of the IC card 112.

FIG. 9 is a plan view illustrating a physical configuration example of the non-contact communication device 112 serving as the IC card of FIG. 6.

In FIG. 9, parts corresponding to the IC card 10 of FIG. 2 are denoted with the same reference numerals, and a description thereof will be appropriately omitted.

In FIG. 9, the IC card 112 has an approximately rectangular card shape, and has an IC chip 12 and an antenna 141 therein.

Thus, the IC card 112 is similar to the IC card 10 of FIG. 2 in that the IC card 112 has the IC chip 12 therein, but is different from the IC card 10 of FIG. 2 in that the IC card 112 has the antenna 141, instead of the antenna 11.

In addition, FIG. 9 illustrates the IC chip 12 and the antenna 141 to be seen. However, the IC chip 12 and the antenna 141 are actually not seen because they are embedded in the IC card 112.

Furthermore, in FIG. 9, the IC chip 12 corresponds to the reception unit 142 or the control unit 149 of FIG. 8.

The antenna 141 has a plurality of coils, for example, three coils 200, 201U, and 201D.

As the coil 200, a coil (a standard coil) having an aperture with a predetermined size slightly smaller than that of the IC card 112 is employed. As the coils 201U and 201D, a coil (a small coil) having a size smaller than that of the coil 200 is employed.

The coils 200, 201U, and 201D are electrically connected in series to one another, or are connected in parallel to one another.

When the total inductance required in the antenna 141 is expressed by L and the inductances of the coils 200, 201U, and 201D are expressed by $L_{200}$, $L_{200U}$, and $L_{200D}$, if the coils 200, 201U, and 201D are connected in series to one another, the inductances $L_{200}$, $L_{200U}$, and $L_{200D}$ are determined such that $L=L_{200}+L_{200U}+L_{200D}$ is satisfied.

Furthermore, when the coils 200, 201U, and 201D are connected in parallel to one another, the inductances $L_{200}$, $L_{200U}$, and $L_{200D}$ are determined such that $1/L\ 1/L_{200}+1/L_{200U}+1/L_{200D}$ is satisfied.

In addition, in the case of manufacturing the IC card 112 by forming the coils 200, 201U, and 201D on a flexible substrate and the like as the antenna 141, serial connection among the coils 200, 201U, and 201D facilitates the manufacturing of the IC card 112 as compared with parallel connection among the coils 200, 201U, and 201D.

The coil 200 (the standard coil) has an aperture with a size slightly smaller than that of the IC card 112, and a winding part arranged slightly inside of the edge of the IC card 112.

Meanwhile, for example, an R/W such as the R/W 20 (an on-top device, FIG. 2), an unnecessary radiation device, or a strong electric field device is assumed as the R/W 111 (FIG. 6) performing non-contact communication with the IC card 112, and the coils 201U and 201D (small coils) are arranged such that a positional relation with a coil serving as an antenna of the assumed R/W (hereinafter, also referred to as assumption R/W) is a predetermined positional relation.

That is, the coils 201U and 201D are arranged such that the apertures of the coils 201U and 201D overlap a winding part of a coil serving as an antenna of the assumption R/W when the IC card 112 is allowed to face the assumption R/W by matching an antenna center (corresponding to the center of gravity of the apertures of the coils 200, 201U, and 201D in which magnetic flux is generated in the antenna 141) of the IC card 112 with an indication mark position which is a reference position of the assumption R/W that is determined in advance as a position with which the antenna center is to be matched as a predetermined position of the IC card 112, for example.

In FIG. 9, the coils 201U and 201D (small coils) are arranged in a row in the longitudinal direction such that the IC card 112 is divided into two equal parts in the transverse direction.

Figure 10:
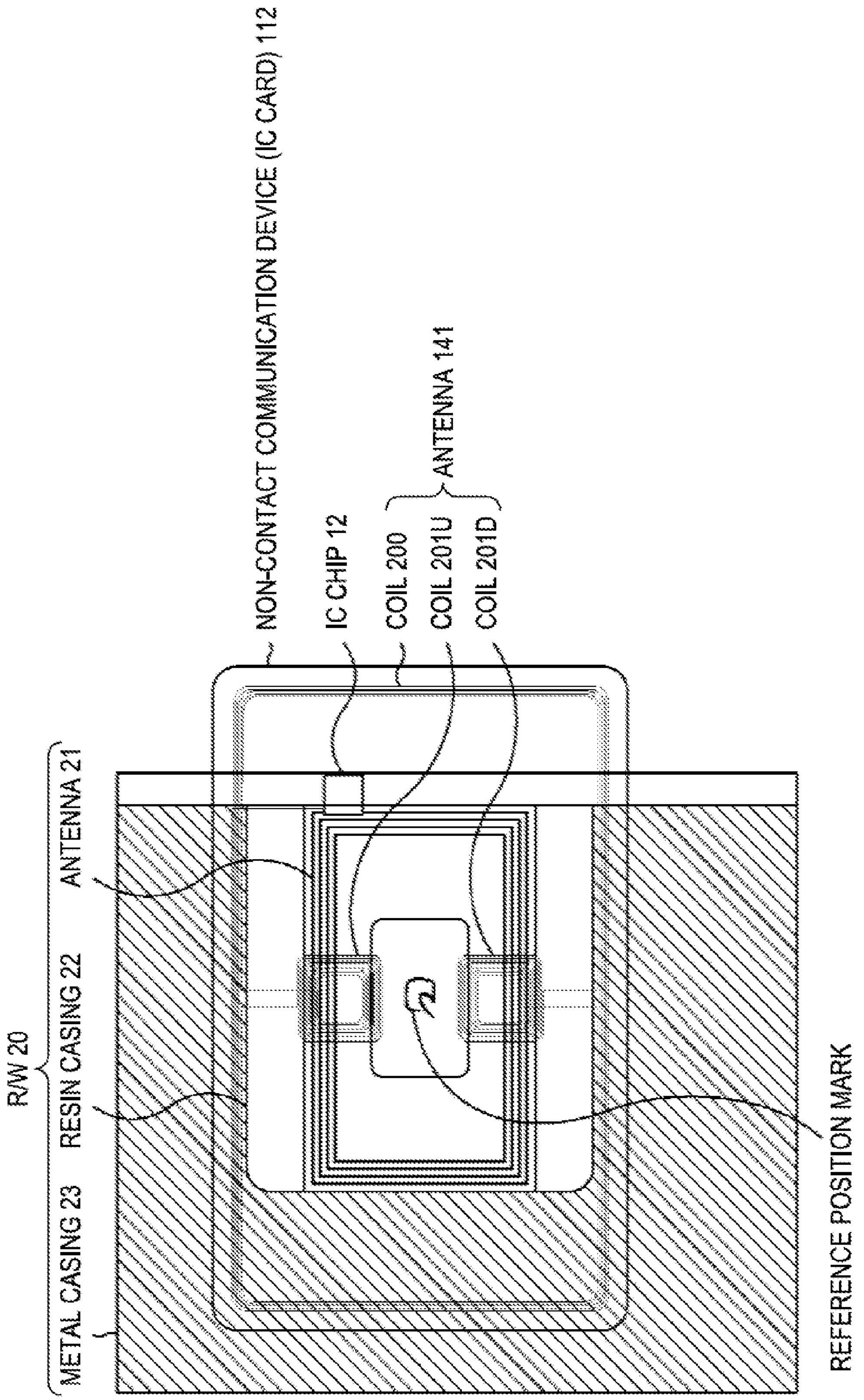
FIG. 10 is a plan view illustrating a first configuration example of a set of antennas 21 and 141 for satisfying a predetermined positional relation.

FIG. 10 is a plan view illustrating a state in which the IC card 112 is placed on the R/W 20 which is an on-top device.

In FIG. 10, the IC card 112 is placed on the R/W 20 which is a kind of the assumption R/W, similarly to the case of FIG. 2.

In addition, FIG. 10 illustrates the IC chip 12 and the antenna 141 to be seen. However, the IC chip 12 and the antenna 141 are actually not seen because they are embedded in the IC card 112.

Furthermore, FIG. 10 illustrates an antenna 21 (of an R/W module) of the R/W 20 if it were to be seen. However, the antenna 21 is actually not seen because it is embedded in a resin casing 22.

In FIG. 10, the coil 200 serving as the antenna 141 of the IC card 112 overlaps a metal casing 23, similarly to the case of FIG. 2. However, the other coils 201U and 201D serving as the antenna 141 overlap only the resin casing 22 without overlapping the metal casing 23.

Therefore, in the IC card 112, the influence of the metal casing 23 with respect to the whole of the antenna 141 is reduced. As a consequence, the antenna 141 overlaps the metal casing 23 and mutual coupling between the antenna 21 of the R/W 20 and the antenna 141 of the IC card 112 is weakened, so that it is possible to prevent non-contact communication from not being performed between the R/W 20 and the IC card 112, resulting in the achievement of stable non-contact communication.

Furthermore, even when there is offset of a certain offset amount (other than (0, 0), for example, an offset amount in the range in which either of an x coordinate and a y coordinate is about −10 mm to +10 mm), since at least one of the coils 201U and 201D serving as the antenna 141 overlaps only the resin casing 22 without overlapping the metal casing 23, it is possible to perform non-contact communication without the communication dead zone.

In addition, the configuration of the antenna 141 of the IC card 112 is not limited to the configurations illustrated in FIG. 9 and FIG. 10. For example, a positional relation between small coils (the coils 201U and 201D in FIG. 9 and FIG. 10) of the antenna 141 and the coil serving as the antenna of the assumption R/W may be a predetermined positional relation described with reference to FIG. 9 according to the configuration of the antenna of the assumption R/W.

That is, in FIG. 10, the antenna 21 (of an R/W module) of the R/W 20 as the assumption R/W includes one coil. However, the antenna 21 may be formed by arranging a plurality of coils on a plane.

Furthermore, in FIG. 10 (FIG. 9), the antenna 141 of the IC card 112 includes the three coils 200, 201U, and 201D, and the coils 201U and 201D (small coils) are arranged in a row in the longitudinal direction such that the IC card 112 is divided into two equal parts in the transverse direction. However, the number of coils constituting the antenna 141 or the arrangement of the small coils is not limited to the aforementioned number or arrangement. For example, the coils may be formed to satisfy the predetermined positional relation described with reference to FIG. 9 according to the configuration of the antenna 21 of the R/W 20 serving as the assumption R/W.

In detail, as a first configuration example of a set of the antennas 21 and 141 for satisfying the predetermined positional relation, the configuration illustrated in FIG. 10 can be employed.

Figure 11:
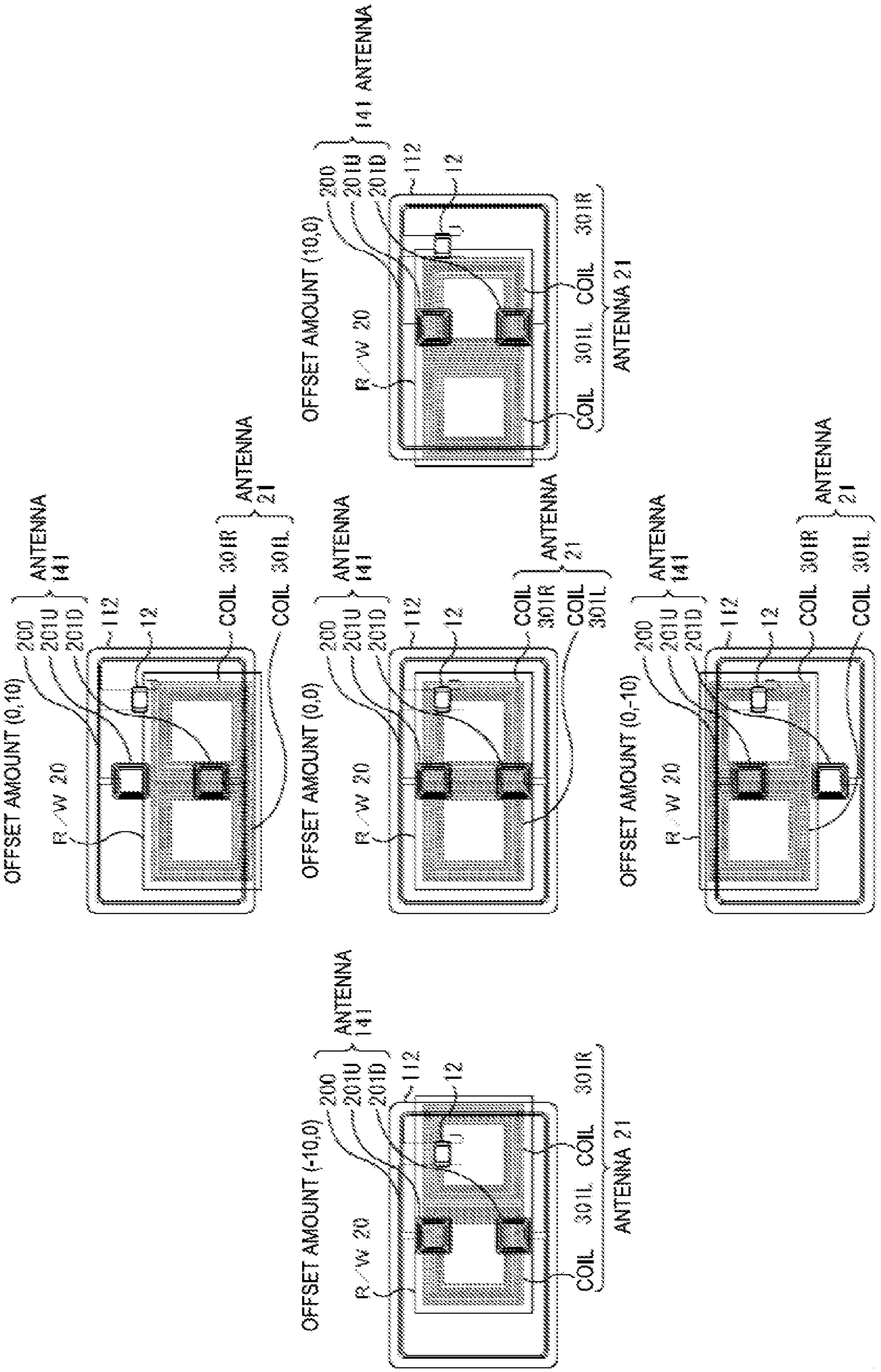
FIG. 11 is a plan view illustrating a second configuration example of the set of antennas 21 and 141 for satisfying a predetermined positional relation.

FIG. 11 is a plan view illustrating a second configuration example of a set of the antennas 21 and 141 for satisfying the predetermined positional relation.

FIG. 11 illustrates a state in which the IC card 112 is placed on the R/W 20 which is the on-top device, similarly to the case of FIG. 10.

In FIG. 11, the antenna 21 of the R/W 20 includes two coils 301L and 301R arranged in a row in the transverse direction.

Furthermore, in FIG. 11, the antenna 141 of the IC card 112 includes three coils 200, 201U, and 201D, similarly to the cases of FIG. 9 and FIG. 10.

Also in FIG. 11, similarly to the case of FIG. 10, the coils 201U and 201D are arranged such that the apertures of the coils 201U and 201D overlap a winding part of at least one of the coils 301L and 301R serving as the antenna 21 of the R/W 20 when the IC card 112 is allowed to face the R/W 20 by matching an antenna center of the IC card 112 with an indication mark position which is a reference position of the R/W 20 that is determined in advance as a position with which the antenna center of the IC card 112 is to be matched in allowing the IC card 112 to face the R/W 20 serving as the assumption R/W.

Furthermore, as described with reference to FIG. 9, the coils 201U and 201D, which are the small coils of the antenna 141 of the IC card 112, are arranged in a row in the longitudinal direction such that the IC card 112 is divided into two equal parts in the transverse direction. However, even when there is offset of a predetermined offset amount (other than (0, 0)) in the IC card 112 placed on the R/W 20 (the on-top device) of FIG. 11, the coils 201U and 201D are arranged such that the aperture of the coil 201U or 201D overlaps the winding part of at least one of the coils 301L and 301R serving as the antenna 21 of the R/W 20.

Figure 12:
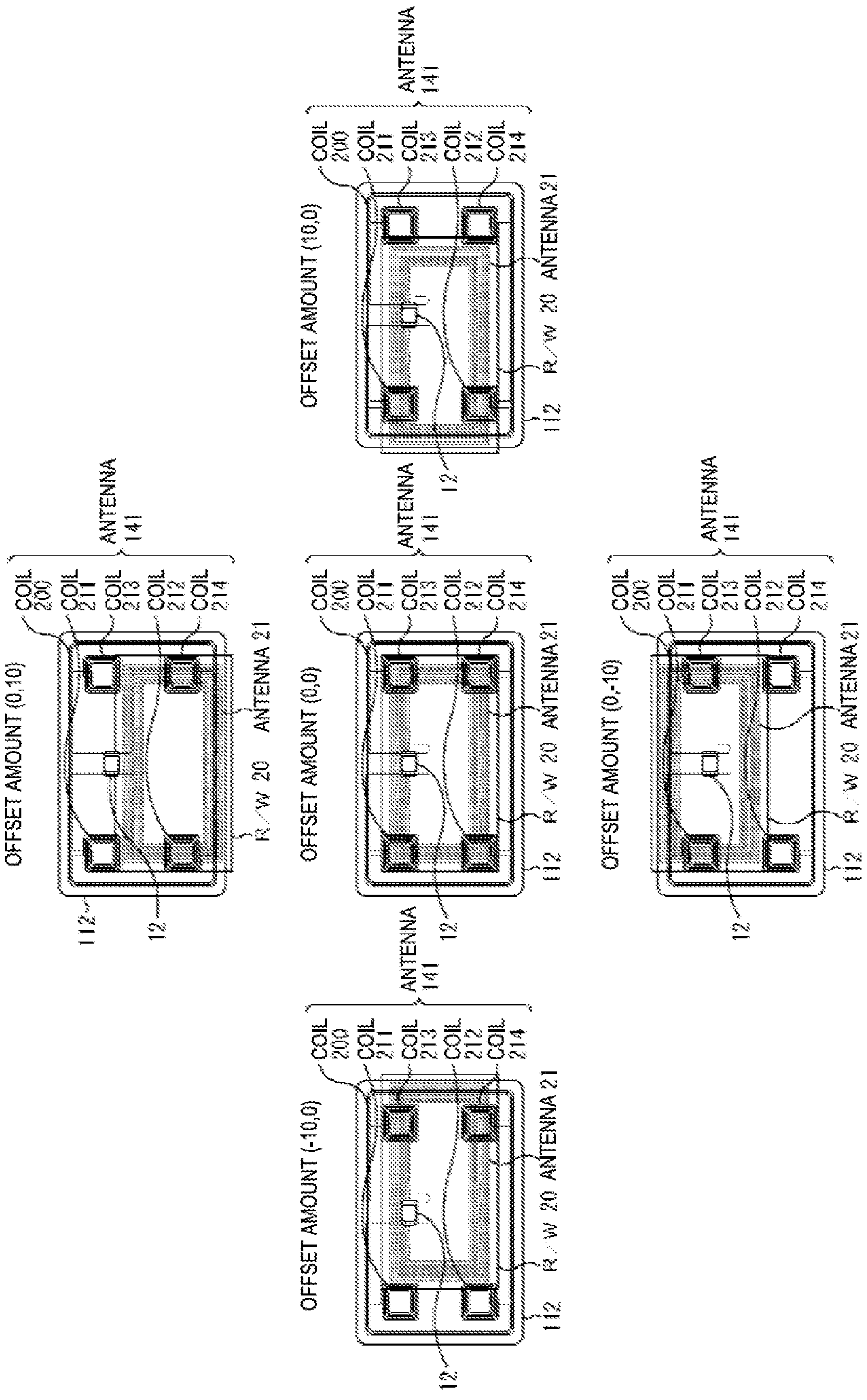
FIG. 12 is a plan view illustrating a third configuration example of the set of antennas 21 and 141 for satisfying a predetermined positional relation
Figure 13:
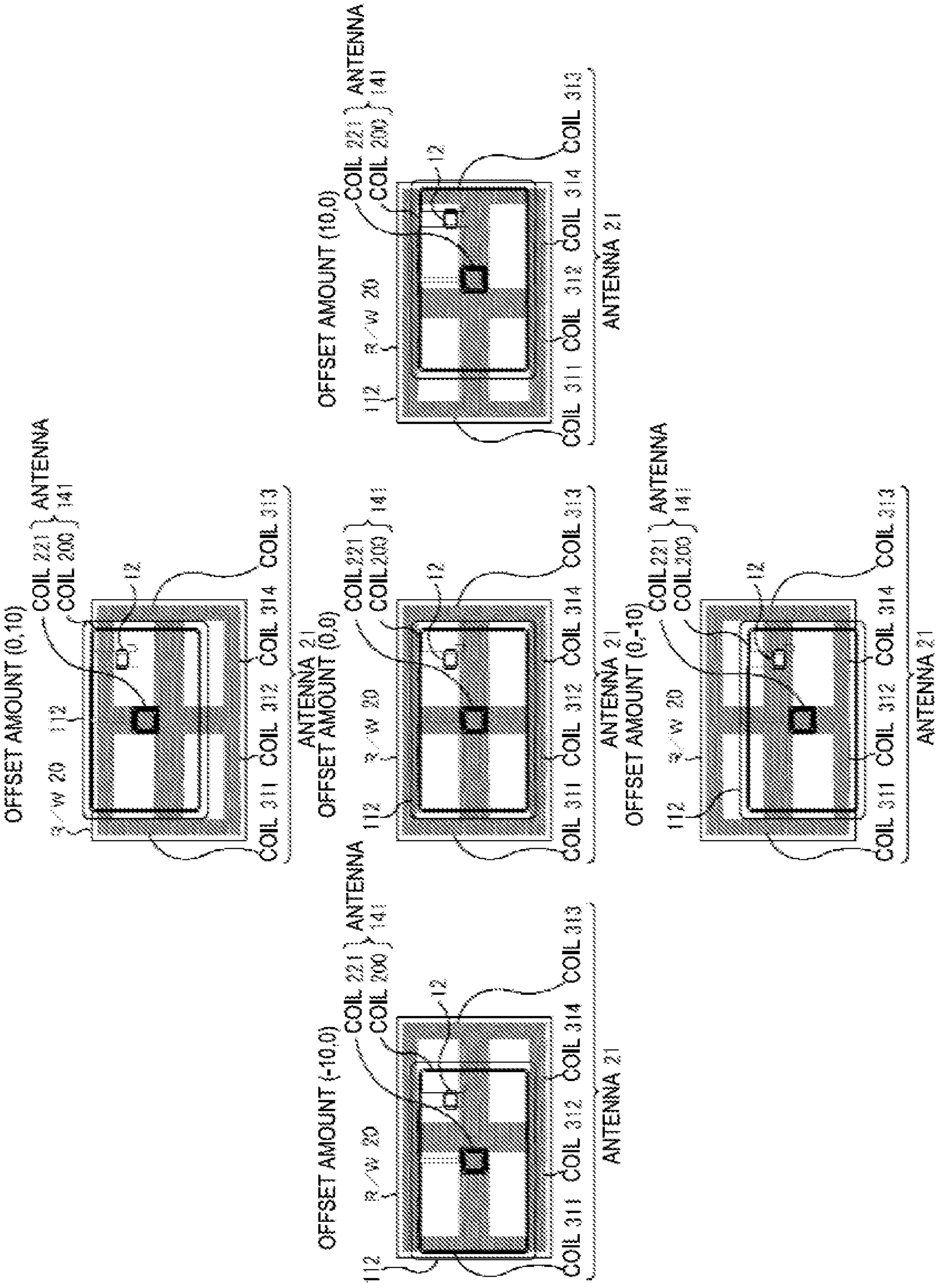
FIG. 13 is a plan view illustrating a fourth configuration example of the set of antennas 21 and 141 for satisfying a predetermined positional relation.

That is, FIG. 11 illustrates the IC card 112 placed on the R/W 20 in the state in which there is offset of an offset amount (10, 0), the IC card 112 placed on the R/W 20 in the state in which there is offset of an offset amount (−10, 0), the IC card 112 placed on the R/W 20 in the state in which there is offset of an offset amount (0, 10), and the IC card 112 placed on the R/W 20 in the state in which there is offset of an offset amount (0, −10), in addition to the IC card 112 placed on the R/W 20 in the state in which there is no offset (there is offset of an offset amount (0, 0)) (the antenna center of the IC card 112 has been matched with the indication mark position which is the reference position of the R/W 20), which is the same in FIG. 12 and FIG. 13 which will be described later.

Referring to FIG. 11, in all of the IC card 112 placed on the R/W 20 in the state in which there is offset of an offset amount (10, 0), the IC card 112 placed on the R/W 20 in the state in which there is offset of an offset amount (−10, 0), the IC card 112 placed on the R/W 20 in the state in which there is offset of an offset amount (0, 10), and the IC card 112 placed on the R/W 20 in the state in which there is offset of an offset amount (0, −10), it can be understood that the aperture of the coil 201U or 201D overlaps the winding part of the coil 301L or 301R serving as the antenna 21 of the R/W 20.

In addition, FIG. 11 illustrates the IC chip 12 and the antenna 141 to be seen. However, the IC chip 12 and the antenna 141 are actually not seen because they are embedded in the IC card 112. Moreover, FIG. 11 illustrates the antenna 21 of the R/W 20 if it were to be seen. However, the antenna 21 is actually not seen because it is embedded in the R/W 20. This is the same in FIG. 12 and FIG. 13 which will be described later.

FIG. 12 is a plan view illustrating a third configuration example of a set of the antennas 21 and 141 for satisfying the predetermined positional relation.

FIG. 12 illustrates a state in which the IC card 112 is placed on the R/W 20 which is the on-top device, similarly to the case of FIG. 10.

In FIG. 12, the antenna 21 of the R/W 20 includes one coil, similarly to the case of FIG. 10.

Furthermore, in FIG. 12, the antenna 141 of the IC card 112 includes five coils 200, 211, 212, 213, and 214.

The coil 200 has an aperture with a size slightly smaller than that of the IC card 112, which is a standard coil having a predetermined size, and a winding part arranged slightly inside the edge of the IC card 112, as described with reference to FIG. 9.

The coils 211 to 214 are coils (small coils) having sizes smaller that of the coil 200, which is the standard coil, and are arranged inside (four corners of the aperture of the coil 200 having an approximately rectangular shape) at four corners of the IC card 112, as compared with a winding part of the coil 200.

In addition, the coils 200 and 211 to 214 are electrically connected in series to one another, or are connected in parallel to one another.

Also in FIG. 12, similarly to the case of FIG. 10, the coils 211 to 214 (small coils) are arranged such that the apertures of the coils 211 to 214 overlap a winding part of the coil serving as the antenna 21 of the R/W 20 when the IC card 112 is allowed to face the R/W 20 by matching an antenna center of the IC card 112 with an indication mark position which is a reference position of the R/W 20 with an offset amount set to (0, 0).

Furthermore, the coils 211 to 214, which are the small coils of the antenna 141 of the IC card 112, are arranged at the four corners of the IC card 112 as described above. However, even when there is offset of a predetermined offset amount (other than (0, 0)) in the IC card 112 placed on the R/W 20 (the on-top device) of FIG. 12, the coils 211 to 214 are arranged such that the apertures of the coil 211 to 214 overlap the winding part of the coil serving as the antenna 21 of the R/W 20.

That is, similarly to the case of FIG. 11, FIG. 12 illustrates the IC card 112 placed on the R/W 20 in the state in which there is offset of an offset amount (10, 0), the IC card 112 placed on the R/W 20 in the state in which there is offset of an offset amount (−10, 0), the IC card 112 placed on the R/W 20 in the state in which there is offset of an offset amount (0, 10), and the IC card 112 placed on the R/W 20 in the state in which there is offset of an offset amount (0, −10), in addition to the IC card 112 placed on the R/W 20 in the state in which there is no offset (there is offset of an offset amount (0, 0)).

Referring to FIG. 12, in all of the IC card 112 placed on the R/W 20 in the state in which there is offset of an offset amount (10, 0), the IC card 112 placed on the R/W 20 in the state in which there is offset of an offset amount (−10, 0), the IC card 112 placed on the R/W 20 in the state in which there is offset of an offset amount (0, 10), and the IC card 112 placed on the R/W 20 in the state in which there is offset of an offset amount (0, −10), it can be understood that the apertures of the coils 211 to 214 overlap the winding part of the coil serving as the antenna 21 of the R/W 20.

FIG. 13 is a plan view illustrating a fourth configuration example of a set of the antennas 21 and 141 for satisfying the predetermined positional relation.

FIG. 13 illustrates a state in which the IC card 112 is placed on the R/W 20 which is the on-top device, similarly to the case of FIG. 10.

In FIG. 13, the antenna 21 of the R/W 20 includes four coils 311, 312, 313, and 314 arranged such that length×breadth is (2×2).

Furthermore, in FIG. 13, the antenna 141 of the IC card 112 includes two coils 200 and 221.

The coil 200 has an aperture with a size slightly smaller than that of the IC card 112, which is a standard coil having a predetermined size, and a winding part arranged slightly inside the edge of the IC card 112, as described with reference to FIG. 9.

The coil 221 is a coil (a small coil) having a size smaller than that of the coil 200, which is the standard coil, and is arranged at a position which is an antenna center of the IC card 112.

In addition, the coils 200 and 221 are electrically connected in series to one another, or are connected in parallel to one another.

Also in FIG. 13, similarly to the case of FIG. 10, when an antenna center of the IC card 112 is matched with an indication mark position which is a reference position of the R/W 20 and the IC card 112 is allowed to face the R/W 20, the coil 221 (the small coil) is arranged such that the aperture of the coil 221 overlaps a winding part of at least one of the coils 311 to 314 serving as the antenna 21 of the R/W 20.

Furthermore, the coil 221, which is the small coil of the antenna 141 of the IC card 112, is arranged at the position which is the antenna center of the IC card 112 as described above. However, even when there is offset of a predetermined offset amount (other than (0, 0)) in the IC card 112 placed on the R/W 20 (the on-top device) of FIG. 13, the coil 221 is arranged such that the aperture of the coil 221 overlaps the winding part of at least one of the coils 311 to 314 serving as the antenna 21 of the R/W 20.

That is, similarly to the case of FIG. 11, FIG. 13 illustrates the IC card 112 placed on the R/W 20 in the state in which there is offset of an offset amount (10, 0), the IC card 112 placed on the R/W 20 in the state in which there is offset of an offset amount (−10, 0), the IC card 112 placed on the R/W 20 in the state in which there is offset of an offset amount (0, 10), and the IC card 112 placed on the R/W 20 in the state in which there is offset of an offset amount (0, −10), in addition to the IC card 112 placed on the R/W 20 in the state in which there is no offset (there is offset of an offset amount (0, 0)).

Referring to FIG. 13, in all of the IC card 112 placed on the R/W 20 in the state in which there is offset of an offset amount (10, 0), the IC card 112 placed on the R/W 20 in the state in which there is offset of an offset amount (−10, 0), the IC card 112 placed on the R/W 20 in the state in which there is offset of an offset amount (0, 10), and the IC card 112 placed on the R/W 20 in the state in which there is offset of an offset amount (0, −10), it can be understood that the aperture of the coil 221 overlaps the winding part of at least one of the coils 311 to 314 serving as the antenna 21 of the R/W 20.

As described above, even when there is offset of a predetermined offset amount in the IC card 112 placed on the assumption R/W serving as the on-top device, in addition to the case in which there is no offset (there is offset of an offset amount (0, 0)), the small coil constituting the antenna 141 of the IC card 112 is arranged such that the aperture of the small coil overlaps the winding part of the coil serving as the antenna of the assumption R/W. Consequently, even when there is offset of a predetermined offset amount (other than (0, 0)) in the IC card 112 placed on the assumption R/W serving as the on-top device, mutual coupling when the IC card 112 is placed on the assumption R/W is weakened (furthermore, unnecessary radiation noise is reduced), so that it is possible to improve tolerance against the unnecessary radiation noise.

Figure 14:
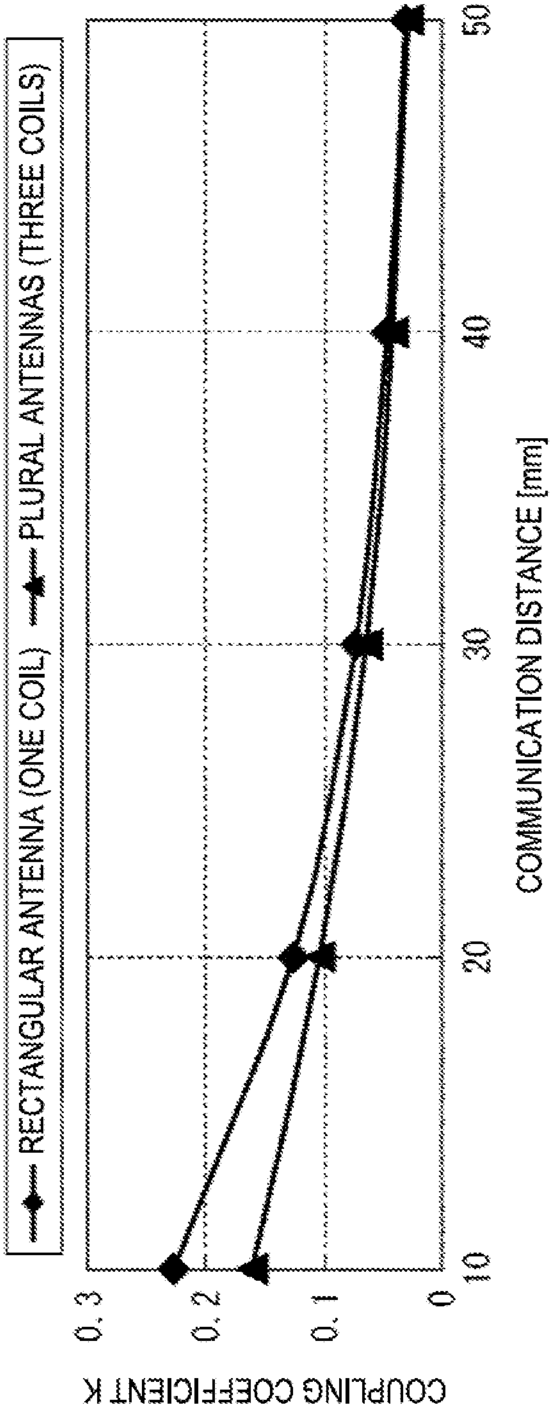
FIG. 14 is a diagram illustrating a relation between a distance from an IC card to an R/W and a coupling coefficient.

FIG. 14 is a diagram illustrating a relation between a distance from an IC card to an R/W (a coil serving as an antenna) and a coupling coefficient.

In FIG. 14, a rhombic mark indicates a coupling coefficient between the R/W 20 (hereinafter, also referred to as a 2-coil R/W 20) having the antenna 21 including the two coils 301L and 301R illustrated in FIG. 11, and the IC card 10 (hereinafter, also referred to as a 1-coil card 10) having the antenna 11 including one coil illustrated in FIG. 2.

Furthermore, in FIG. 14, a triangular mark indicates a coupling coefficient between the 2-coil R/W 20 illustrated in FIG. 11 and the IC card 112 (hereinafter, also referred to as a 3-coil card 112) having the antenna 141 including the three coils 200, 201U, and 201D illustrated in FIG. 11.

In addition, in FIG. 14, an offset amount is (0, 0). Furthermore, the one coil serving as the antenna 11 of the 1-coil card 10 and the coil 200, which is the standard coil of the 3-coil card 112, have the same arrangement and size.

Referring to FIG. 14, when a distance to the 2-coil R/W 20 is long (for example, when the distance is 50 mm), it can be understood that coupling coefficients of the 1-coil card 10 and the 3-coil card 112 have the same value.

Consequently, it is possible for the 3-coil card 112 to maintain a communication distance similarly to the case of the 1-coil card 10.

Furthermore, in FIG. 14, for example, when the distance to the 2-coil R/W 20 is short (for example, when the distance is 10 mm) similarly to the state in which the 1-coil card 10 or the 3-coil card 112 is placed on the 2-coil R/W 20, it can be understood that the coupling coefficient of the 3-coil card 112 is smaller than the coupling coefficient of the 1-coil card 10.

Consequently, in the state in which the 3-coil card 112 is placed on the R/W 20, mutual coupling between the 3-coil card 112 and the R/W 20 is weakened as compared with mutual coupling between the R/W 20 and the 1-coil card 10. Therefore, even when the R/W 20 causes unnecessary radiation noise, the influence of the unnecessary radiation noise to the 3-coil card 112 is small as compared with the influence of the unnecessary radiation noise to the 1-coil card 10.

As described above, the coupling coefficient of the 3-coil card 112, which has the coils 201U and 201D with sizes smaller than that of the coil 200 serving as the antenna 141 in addition to the coil 200 (equal to the coil serving as the antenna of the 1-coil card 10), is equal to that of the 1-coil card 10 at a position at which the distance to the 2-coil R/W 20 is long, and is smaller than that of the 1-coil card 10 at a position at which the distance to the 2-coil R/W 20 is short.

Consequently, according to the 3-coil card 112, it is possible to reduce the influence of the unnecessary radiation noise from the 2-coil R/W 20 when the 3-coil card 112 has been placed on the 2-coil R/W 20 while maintaining a communication distance similarly to the case of the 1-coil card 10.

In addition, in the 1-coil card 10 (FIG. 2), when the aperture (the antenna aperture area) of one coil serving as the antenna 11 is allowed to be small, it is possible to reduce the influence of the unnecessary radiation noise. However, it is not possible to maintain the communication distance (the communication distance is shortened).

Figure 15:
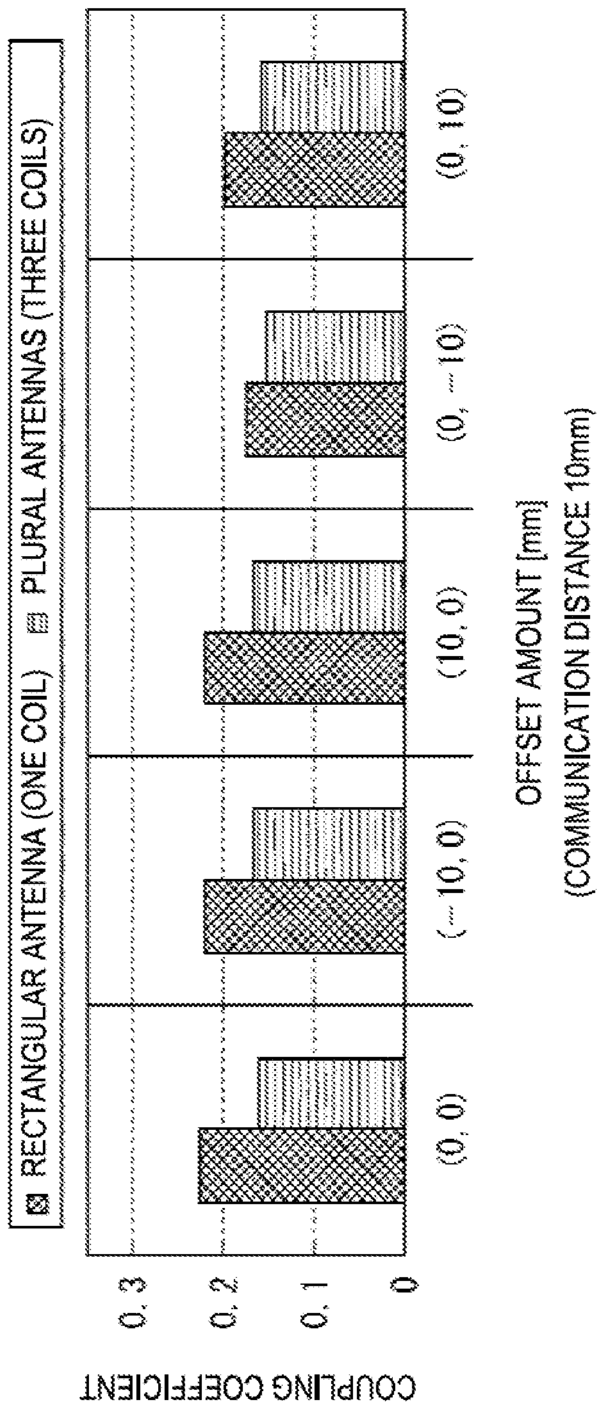
FIG. 15 is a diagram illustrating coupling coefficients of a 2-coil R/W 20 and each of a 1-coil card 10 and a 3-coil card 112.

FIG. 15 is a diagram illustrating coupling coefficients of the 1-coil card 10 and the 3-coil card 112 having been offset by each offset amount at a position of 20 mm at which the distance to the 2-coil R/W 20 is relatively short.

In FIG. 15, regardless of the offset amounts, the coupling coefficients (parts with horizontal lines) of the 3-coil card 112 are smaller than the coupling coefficients (parts with inclined lines) of the 1-coil card 10.

In FIG. 15, since there are five offset amounts (0, 0), (10, 0), (−10, 0), (0, 10), and (0, −10), when the distance to the 2-coil R/W 20 is short, it can be understood that it is possible to reduce the influence of the unnecessary radiation noise to the 3-coil card 112 regardless of the presence or absence of the offset amounts, as compared with the 1-coil card 10.

In order to reduce the influence of the unnecessary radiation noise (to improve tolerance against the unnecessary radiation noise) when there is offset, it is effective to arrange a standard coil and a small coil serving as the antenna 141 of the IC card 112 at appropriate positions.

FIG. 16 is a diagram illustrating a correct communication rate for each offset amount (x, y) of the 3-coil card 112 when a resonant frequency fo of the 3-coil card 112 has been set as each frequency.

In FIG. 16, the correct communication rate represents a rate by which data exchange has succeeded between the 3-coil card 112 and the 2-coil R/W 20.

In addition, the resonance frequency fo of the 3-coil card 112, for example, can be set as various frequencies by adjusting the capacitance of the capacitor (not illustrated) connected to the antenna 141 of the 3-coil card 112.

In FIG. 16, similarly to the case of FIG. 4, five types of offset amounts (offset positions) (5,0), (0, 0), (−5,0), (0,5), and (0,−5) are employed as the offset amount (x, y), and eight types of frequencies in the range of 13.6 MHz to 14.4 MHz at an interval of 0.1 MHz are employed as the resonance frequency fo.

As described with reference to FIG. 4, in the 1-coil card 10, if the resonance frequency fo is equal to or more than 13.9

MHz, a communication dead zone occurs at three or more of the five types of offset amounts. However, as illustrated in FIG. 16, according to the 3-coil card 112, no communication dead zone (parts with inclined lines) occurs, differently from the 1-coil card 10. Consequently, it can be understood that the offset characteristics are improved.

FIG. 17 is a diagram illustrating the presence or absence of a communication dead zone, which indicates whether the communication dead zone occurs in the 3-coil card 112.

In FIG. 17, since records of first to fifth rows (from the top) are equal to the records of first to fifth rows of FIG. 5 (although FIG. 5 does not illustrate the number of antenna coils indicating the number of coils constituting the antenna), the records indicate the presence or absence of the communication dead zone of the 1-coil card 10.

Furthermore, in FIG. 17, a record of a sixth row (a record of the lowermost row) indicates the presence or absence of the communication dead zone of the 3-coil card 112.

In addition, in FIG. 17, similarly to the case of FIG. 5, as an R/W which performs non-contact communication with the 3-coil card 112, the R/W 20 (the 2-coil R/W 20) as the on-top device and the unnecessary radiation device have been employed.

Furthermore, similarly to the case of FIG. 5, in addition to the presence or absence of the communication dead zone, FIG. 17 also illustrates a communication distance when the 3-coil card 112 performs the non-contact communication with the R/W which is the strong electric field device.

Referring to FIG. 17, 10 mm or more is ensured as the communication distance between the 3-coil card 112 and the strong electric field device, similarly to the communication distance between each of the IC cards 10 (the 1-coil card 10) having antenna aperture areas of 39 $mm^2$, 36 $mm^2$, 34 $mm^2$, 30 $mm^2$, and 26 $mm^2$ and the strong electric field device.

Here, in the non-contact communication between the 3-coil card 112 and the unnecessary radiation device, the presence or absence of the communication dead zone has been examined by employing the five types of offset amounts (0, 0), (10,0), (−10,0), (0,10), and (0,−10), similarly to the case of FIG. 5.

Furthermore, in the non-contact communication between the 3-coil card 112 and the on-top device, the presence or absence of the communication dead zone has been examined by employing the five types of offset amounts (0, 0), (5,0), (−5,0), (0,5), and (0,−5), similarly to the case of FIG. 5.

Moreover, the communication distance between the 3-coil card 112 and the strong electric field device has been measured by employing the offset amount (0, 0).

Furthermore, as the antenna aperture area (of the coil 200 which is the standard coil) of the antenna 141 of the 3-coil card 112, 39 $cm^2$ has been employed, which is equal to the antenna aperture area of the IC card 10, in which the communication dead zone has occurred, in the non-contact communication with the unnecessary radiation device or the on-top device.

In FIG. 17, "Present" indicates the occurrence of the communication dead zone and "Absent" indicates the non-occurrence of the communication dead zone.

Referring to FIG. 17, both in the non-contact communication between the 3-coil card 112 and the unnecessary radiation device and the non-contact communication between the 3-coil card 112 and the on-top device, it can be understood that no communication dead zone occurs regardless of offset, so that the offset characteristics and the tolerance against the unnecessary radiation noise are improved while the communication distance is being maintained.

Meanwhile, in FIG. 11 to FIG. 13, the number and the arrangement of the small coils constituting the antenna 141 of the IC card 112 are adjusted, thereby preventing the communication dead zone from occurring (preventing the communication dead zone from occurring in the IC card 112). However, for example, if a line width (a line diameter) of a winding of the coil constituting the antenna 141, or a resistance value of the winding is adjusted by a conductive metal used as the winding, it is possible to further effectively prevent the communication dead zone.

FIG. 18 is a diagram illustrating the presence or absence of the communication dead zone, which indicates whether the communication dead zone occurs in the 3-coil card 112 when the diameters of the coils 200, 201U, and 201D constituting the antenna 141 of the 3-coil card 112 have values illustrated in FIG. 18.

In addition, in order to check the presence or absence of the communication dead zone of FIG. 18, the 3-coil card 112, in which an interval between the coils 201U and 201D (small coils) is shorter than an appropriate interval (an interval in which the communication dead zone is the least likely to occur in the non-contact communication with the 2-coil R/W 20), has been employed such that the communication dead zone easily occurs.

In addition, in FIG. 18, similarly to the case of FIG. 5 or FIG. 17, as an R/W which performs non-contact communication with the 3-coil card 112, the R/W 20 (the 2-coil R/W 20) as the on-top device and the unnecessary radiation device have been employed.

Moreover, in addition to the presence or absence of the communication dead zone, FIG. 18 also illustrates a communication distance when the IC card 10 performs the non-contact communication with the R/W which is the strong In FIG. 18, 10 mm or more is ensured as the communication distance between the 3-coil card 112 and the strong electric field device.

Furthermore, in the non-contact communication between the 3-coil card 112 and the unnecessary radiation device, the presence or absence of the communication dead zone has been examined by employing the five types of offset amounts (0, 0), (10,0), (−10,0), (0,10), and (0,−10).

Moreover, in the non-contact communication between the 3-coil card 112 and the on-top device, the presence or absence of the communication dead zone has been examined by employing the five types of offset amounts (0, 0), (5,0), (−5, 0), (0,5), and (0,−5).

Furthermore, the communication distance between the 3-coil card 112 and the strong electric field device has been measured by employing the offset amount (0, 0).

In FIG. 18, "Present" indicates the occurrence of the communication dead zone and "Absent" indicates the non-occurrence of the communication dead zone.

Referring to FIG. 18, if the diameters of the coils 200, 201U, and 201D constituting the antenna 141 of the 3-coil card 112 are reduced to 0.0045 mm to increase resistance values thereof, it can be understood that it is possible to improve communication performance of the non-contact communication between the 3-coil card 112 and the unnecessary radiation device (to prevent the communication dead zone from occurring) while maintaining the communication distance to the strong electric field device, without deterioration of communication performance of the non-contact communication between the 3-coil card 112 and the on-top device (without the communication dead zone).

Consequently, the small coils (the coils 201U, 201D and the like) of the antenna 141 of the 3-coil card 112 are arranged at positions at which the communication dead zone does not easily occur (does not occur) in the non-contact communication with the assumption R/W, and the diameters and resistance values of the standard coil (the coil 200) as the antenna 141 and the small coils are adjusted, so that it is possible to improve all the communication distance, the offset characteristics, and the tolerance against the unnecessary radiation noise.

In addition, if the diameters of the coils 200, 201U, and 201D serving as the antenna 141 are reduced to excessively increase the resistance values thereof, since the communication distance is reduced, it is important to adjust the diameters of the coils 200, 201U, and 201D in a range in which it is possible to ensure the communication distance required for the 3-coil card 112.

Furthermore, the resistance values of the coils 200, 201U, and 201D serving as the antenna 141 can also be adjusted by changing the conductive metal of the coils 200, 201U, and 201D, in addition to a change in the diameters thereof. For example, the conductive metal is changed from copper to aluminum, resulting in a reduction of the resistance values.

Here, when no tuning capacitor for adjusting a resonance frequency is provided and tuning is performed using only the coils 200, 201U, and 201D, the total inductance of the antenna 141 of the IC card 112 is approximately constant. However, in this case, in order to improve the communication performance of the IC card 112, it is effective to adjust the balance of each inductance of the coils 200, 201U, and 201D.

In addition, since the plurality of coils 200, 201U, and 201D are electrically connected to one another and constitute the antenna 141 of the IC card 112, the present technology is different from the technology disclosed in Patent Literature 1 in which a plurality of coils are not electrically connected to one another, and the technology disclosed in Patent Literature 2 in which one of two coils is an antenna of a card IC function unit and the other coil is an antenna of a reader/writer function unit.

Furthermore, the present technology is particularly useful when the size of the standard coil (for example, the coil 200 of the IC card 112) is equal to or more than the size (the antenna aperture area) of the coil serving as the antenna of the assumption R/W. As the small coils (for example, the coils 201U and 201D of the IC card 112), coils having sizes equal to or less than the size (when the antenna of the assumption R/W includes a plurality of coils as illustrated in FIG. 11 or FIG. 13, the size of each coil constituting the antenna) of the coil serving as the antenna of the assumption R/W are employed.

In addition, the embodiment of the present technology is not limited to the above-mentioned embodiment. For example, various modifications may occur within the scope of the present technology.

That is, the present technology can also be applied to non-contact communication of a communication device which performs both non-contact communication and contact communication, in addition to non-contact communication of a communication device which performs only non-contact communication.

Additionally, the present technology may also be configured as below.

[1] A non-contact communication device comprising an antenna configured to transmit data through non-contact communication after load-modulation of an RF signal from a reader/writer (R/W), wherein the antenna includes:

a standard coil having an aperture with a predetermined size; and a small coil having an aperture with a size smaller than a size of the standard coil, wherein the standard coil and the small coil are connected in series or in parallel, and the small coil is arranged such that the aperture of the small coil overlaps a winding part of a coil that is an antenna of the R/W when the non-contact communication device is caused to face the R/W by matching a predetermined position of the non-contact communication device with a reference position of the R/W that is determined in advance as a position with which the predetermined position of the non-contact communication device is to be matched in causing the non-contact communication device to face the R/W.

[2] The non-contact communication device according to [1], wherein the standard coil has a size equal to or more than a size of the coil which is the antenna of the R/W, and the small coil has a size equal to or less than the size of the coil which is the antenna of the R/W.

[3] The non-contact communication device according to [1] or [2], wherein the standard coil and the small coil are connected in series.

[4] The non-contact communication device according to any one of [1] to [3], wherein the antenna includes a plurality of small coils.

It should be understood by those skilled in the art that various modifications, combinations, sub-combinations and alterations may occur depending on design requirements and other factors insofar as they are within the scope of the appended claims or the equivalents thereof.

What is claimed is:

1. A non-contact communication device comprising an antenna configured to transmit data to a reader/writer (R/W) through non-contact communication after load-modulation of an RF signal received from the R/W, wherein the antenna includes:

a standard coil having an aperture with a predetermined size; and a plurality of small coils, each of the plurality of small coils having an aperture with a size smaller than the predetermined size of the aperture of the standard coil, wherein the plurality of small coils are arranged such that the aperture of at least one of the plurality of small coils overlaps a winding part of a coil that is an antenna of the R/W when the non-contact communication device is caused to face the R/W by matching a predetermined position of the non-contact communication device with a reference position of the R/W that is determined in advance as a position with which the predetermined position of the non-contact communication device is to be matched in causing the non-contact communication device to face the R/W.

2. The non-contact communication device according to claim 1, wherein the standard coil has a size equal to or more than a size of the coil which is the antenna of the R/W, and each of the plurality of small coils has a size equal to or less than the size of the coil which is the antenna of the R/W.

3. The non-contact communication device according to claim 1, wherein the standard coil and the plurality of small coils are connected in series.

4. The non-contact communication device according to claim 1, wherein the standard coil overlaps a metal casing of the R/W when the predetermined position of the non-contact communication device matches the reference position of the R/W.

5. The non-contact communication device according to claim 1, wherein the plurality of small coils overlap a resin casing of the R/W when the predetermined position of the non-contact communication device matches the reference position of the R/W.

6. The non-contact communication device according to claim 1, wherein a winding part of the standard coil is arranged inside an edge of the non-contact communication device, wherein each of the plurality of small coils is arranged inside the winding part of the standard coil.

7. The non-contact communication device according to claim 1, wherein the standard coil and the plurality of small coils are connected in parallel.

* * * * *